United States Patent
Han

(10) Patent No.: US 10,815,968 B2
(45) Date of Patent: Oct. 27, 2020

(54) CONCENTRIC WING TURBINES

(71) Applicant: Differential Dynamics Corporation, Owings Mills, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 16/701,741

(22) Filed: Dec. 3, 2019

(65) Prior Publication Data

US 2020/0191120 A1  Jun. 18, 2020

Related U.S. Application Data

(63) Continuation-in-part of application No. 16/233,365, filed on Dec. 27, 2018.

(Continued)

(51) Int. Cl.
| | |
|---|---|
| *F03D 9/25* | (2016.01) |
| *F03D 13/20* | (2016.01) |
| *F03D 15/10* | (2016.01) |
| *F03B 7/00* | (2006.01) |
| *F03B 13/26* | (2006.01) |
| *F03B 15/12* | (2006.01) |

(Continued)

(52) U.S. Cl.
CPC ............... *F03D 9/25* (2016.05); *F03B 7/003* (2013.01); *F03B 13/264* (2013.01); *F03B 15/12* (2013.01); *F03D 3/0454* (2013.01); *F03D 3/0472* (2013.01); *F03D 13/20* (2016.05); *F03D 15/10* (2016.05); *F03B 11/02* (2013.01); *F03B 17/061* (2013.01); *F03B 17/063* (2013.01); *F03D 80/70* (2016.05); *F05B 2210/16* (2013.01); *F05B 2240/12* (2013.01); *F05B 2240/40* (2013.01); *F05B 2240/91* (2013.01); *F05B 2240/93* (2013.01); *F05B 2260/4031* (2013.01)

(58) Field of Classification Search
CPC ...... F03B 13/183; F03B 17/063; F03B 7/003; F03B 7/00; F03B 17/065; E02B 9/00; B63B 35/44; A63H 33/30
USPC ............................ 290/42, 43, 44, 53, 54, 55
See application file for complete search history.

(56) References Cited

U.S. PATENT DOCUMENTS

| | | | | |
|---|---|---|---|---|
| 2,503,832 | A | * 4/1950 | McCune | ................ A63H 33/30 |
| | | | | 446/166 |
| 3,984,698 | A | * 10/1976 | Brewer | ................... F03B 7/003 |
| | | | | 290/54 |

(Continued)

FOREIGN PATENT DOCUMENTS

WO WO-2017220995 A1 * 12/2017 ............... F03B 7/00

*Primary Examiner* — Charles Reid, Jr.
(74) *Attorney, Agent, or Firm* — Cameron LLP

(57) ABSTRACT

A harnessing module for harnessing renewable wind and water energy has opposing concentric wings for rotation about a turbine shaft having a hub having a wing support shaft for supporting each wing of at least one pair of opposing concentric wings for use in generating renewable electrical energy. Each concentric wing of the opposing concentric wings may have a circular leading edge or a curved leading edge for facing one of air and water flow. Hence, the opposing concentric wings rotate about the turbine shaft in-line with a horizontal flow of air or water such that the turbine shaft faces a flow direction of the air or water and forms a harnessing module for generating electricity from either the wind or water flow.

6 Claims, 27 Drawing Sheets

Assembly of an In-Line Platform River Turbine

Related U.S. Application Data

(60) Provisional application No. 62/779,693, filed on Dec. 14, 2018.

(51) Int. Cl.
  *F03D 3/04* (2006.01)
  *F03D 80/70* (2016.01)
  *F03B 17/06* (2006.01)
  *F03B 11/02* (2006.01)

(56) References Cited

U.S. PATENT DOCUMENTS

| | | | | |
|---|---|---|---|---|
| 5,440,175 A * | 8/1995 | Mayo, Jr. | F03B 7/003 | 290/53 |
| 6,208,037 B1 * | 3/2001 | Mayo, Jr. | E02B 9/00 | 290/42 |
| 7,375,437 B2 * | 5/2008 | Peckham | F03B 17/063 | 290/43 |
| 8,120,196 B1 * | 2/2012 | Neese | F03B 13/183 | 290/53 |
| 8,485,933 B2 * | 7/2013 | Han | F03B 3/18 | 475/205 |
| 8,593,005 B2 * | 11/2013 | Drews | F03B 7/00 | 290/43 |
| 9,912,209 B2 | 3/2018 | Han | | |
| 10,378,506 B2 | 8/2019 | Han | | |
| 2005/0017513 A1 * | 1/2005 | Sipp | F03B 17/063 | 290/54 |
| 2006/0131890 A1 * | 6/2006 | Gizara | F03B 17/065 | 290/43 |
| 2009/0126612 A1 * | 5/2009 | Williams | B63B 35/44 | 114/61.2 |
| 2010/0237625 A1 * | 9/2010 | Dempster | F03B 7/00 | 290/54 |
| 2010/0237626 A1 * | 9/2010 | Hamner | F03B 17/065 | 290/54 |
| 2010/0301609 A1 * | 12/2010 | Kim | F03B 17/065 | 290/54 |
| 2011/0173976 A1 * | 7/2011 | Meadon | F03B 7/003 | 60/639 |
| 2012/0032451 A1 * | 2/2012 | Heitmann | F03B 7/00 | 290/1 D |
| 2012/0098266 A1 * | 4/2012 | Fransen | F03B 17/062 | 290/54 |
| 2012/0119501 A1 * | 5/2012 | Yeomans | F03B 13/264 | 290/54 |
| 2012/0139251 A1 * | 6/2012 | Pai | F03B 17/067 | 290/54 |
| 2012/0299304 A1 * | 11/2012 | Al-Saffar | F03B 17/005 | 290/54 |
| 2013/0026762 A1 * | 1/2013 | Rajadhyaksha | F03B 17/063 | 290/54 |
| 2013/0229014 A1 * | 9/2013 | Willingham | F03B 7/00 | 290/54 |
| 2013/0313833 A1 * | 11/2013 | Bang | F03B 17/063 | 290/54 |
| 2014/0159366 A1 * | 6/2014 | Figueroa Nunez | F03B 17/063 | 290/43 |
| 2015/0159620 A1 * | 6/2015 | Widmer | F03B 17/063 | 290/54 |
| 2015/0252774 A1 * | 9/2015 | Shimizu | F03B 17/065 | 416/7 |
| 2016/0084217 A1 * | 3/2016 | Huebner | F03B 7/003 | 290/54 |
| 2018/0195582 A1 | 7/2018 | Han | | |
| 2019/0360455 A1 * | 11/2019 | Youssef | F03B 17/063 | |

* cited by examiner

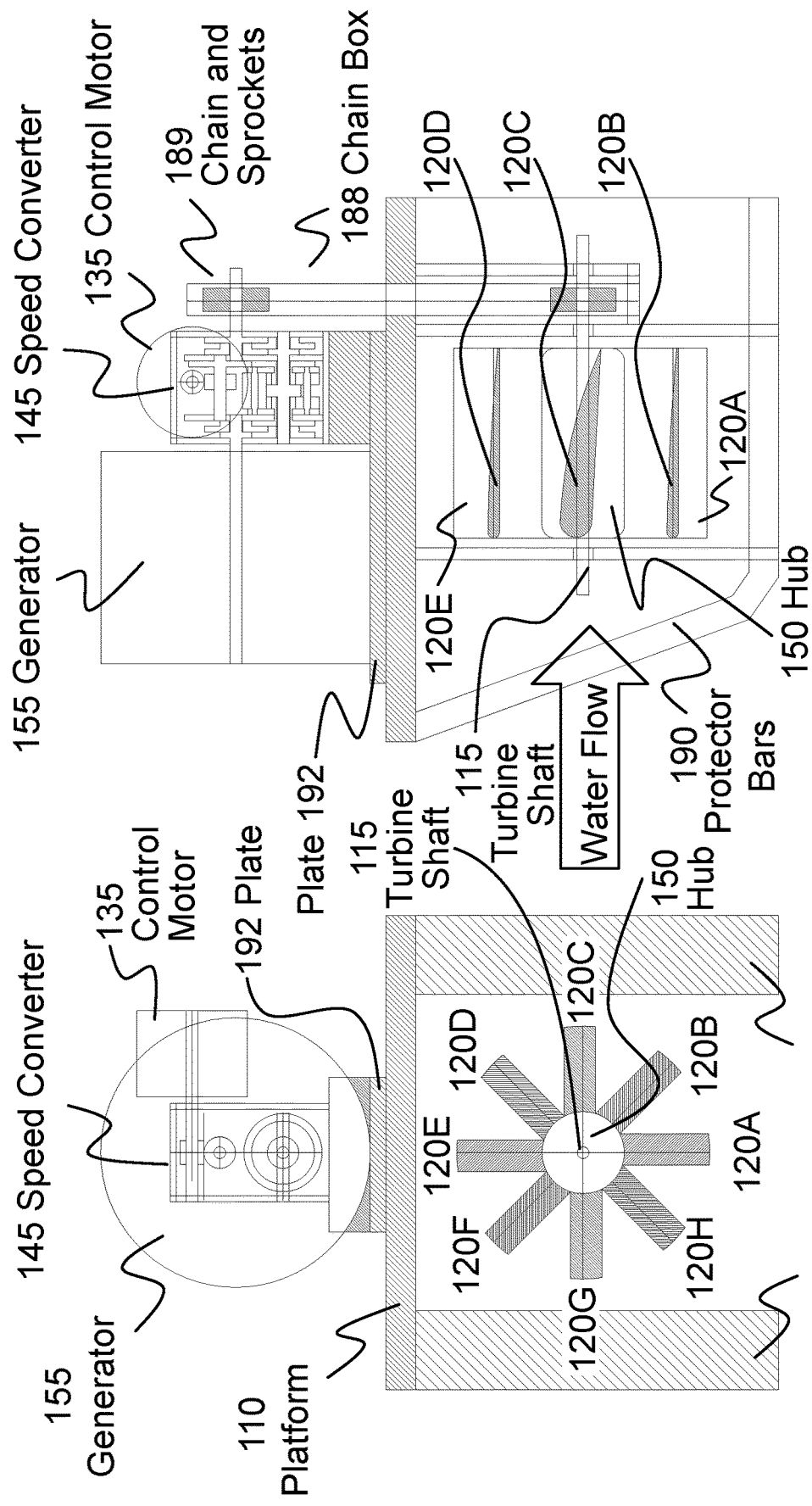
Figures 1A - 1B. Assembly of an In-Line Platform River Turbine

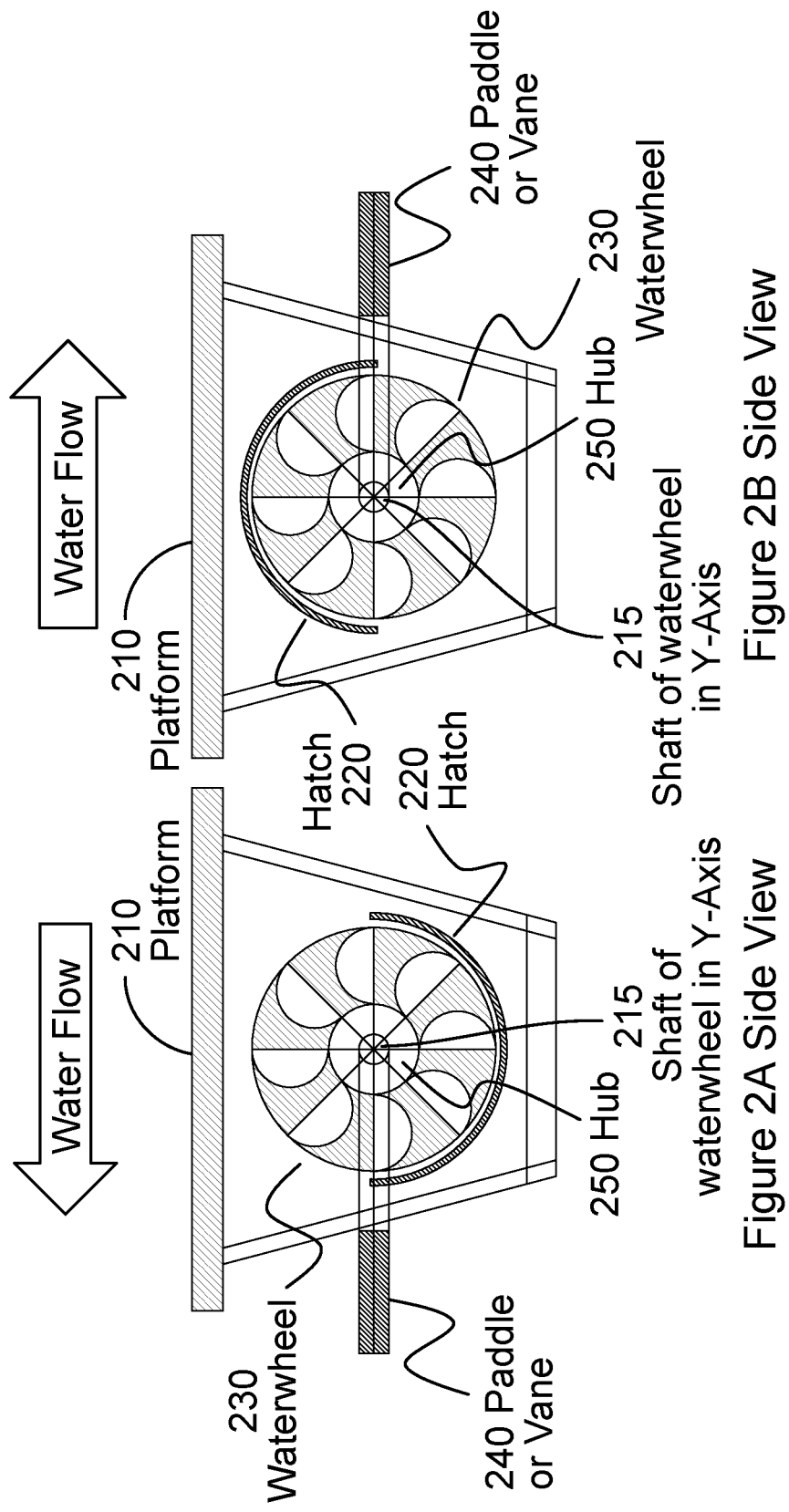
Figures 2A - 2B. Water Energy Harnessing Module (Bi-Directional water flow): Vane/Paddle Controlled Hatch of waterwheel 230 with horizontal shaft to the flow of water or along the Y-Axis
PRIOR ART

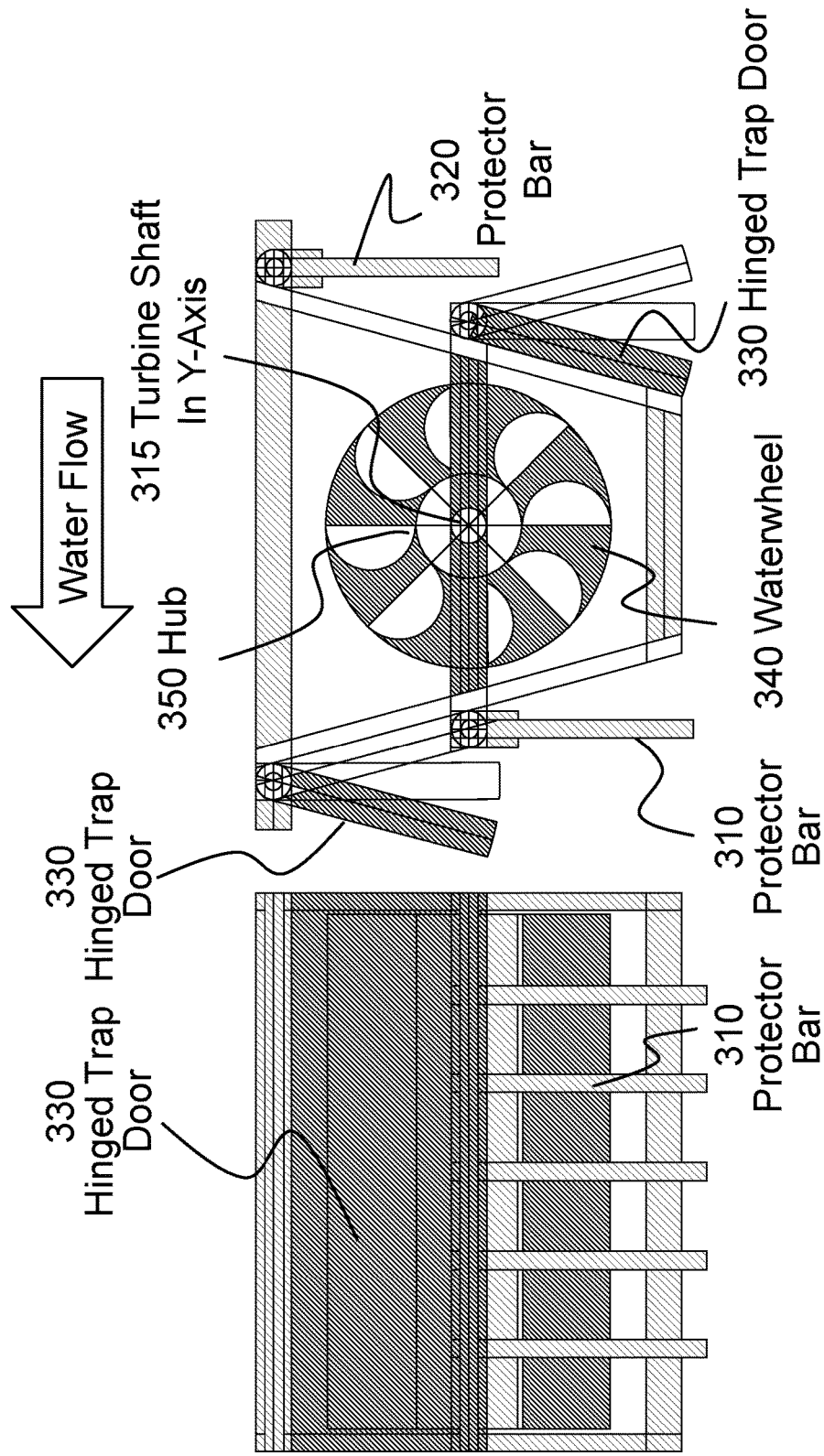
Figure 3A: Front View    Figure 3B: Side View
Figures 3A - 3B. Tidal Turbines (Bi-Directional Flow):
Hinged Trap Door-Controlled Tidal Turbines
PRIOR ART

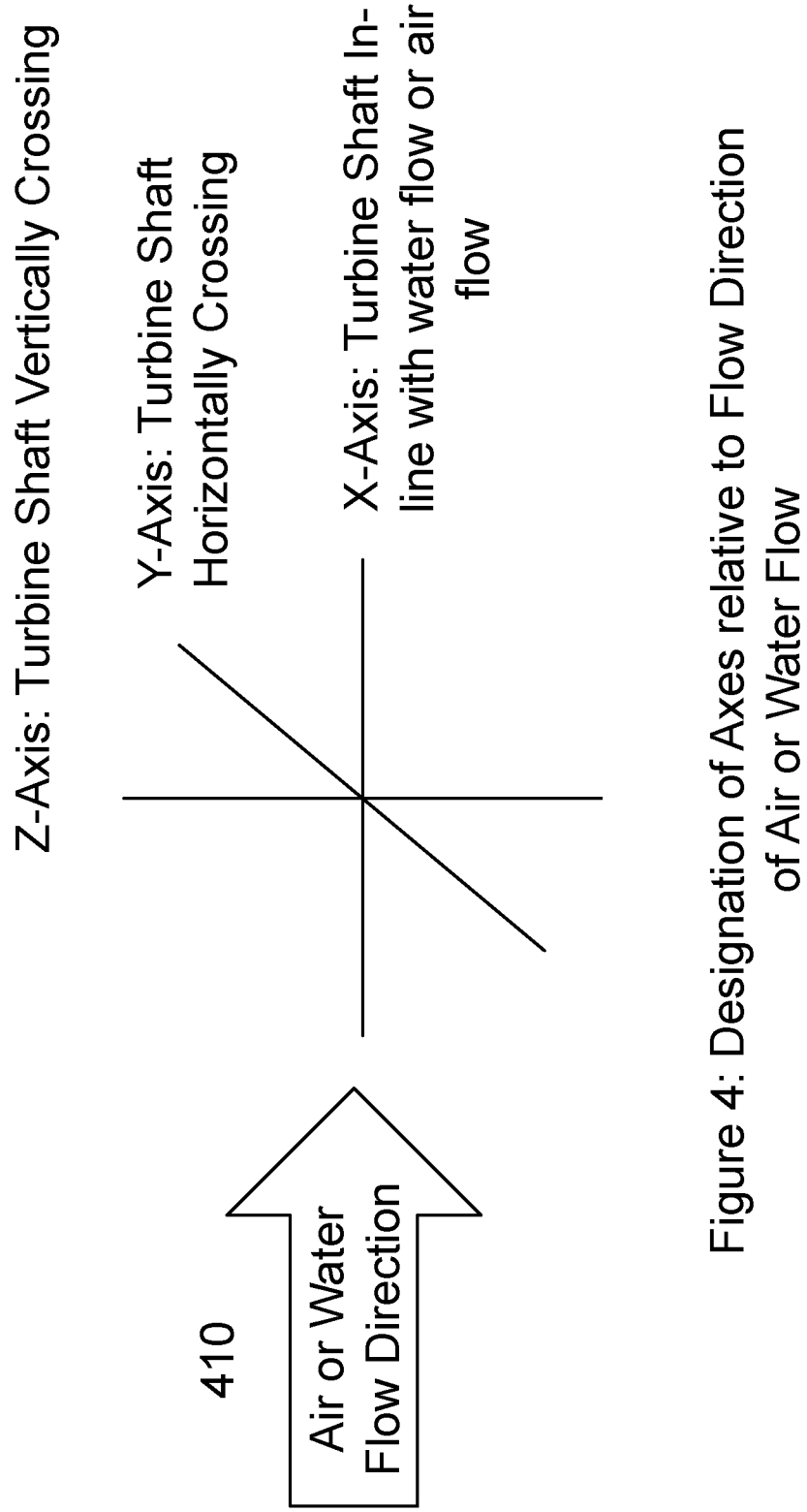
Figure 4: Designation of Axes relative to Flow Direction of Air or Water Flow

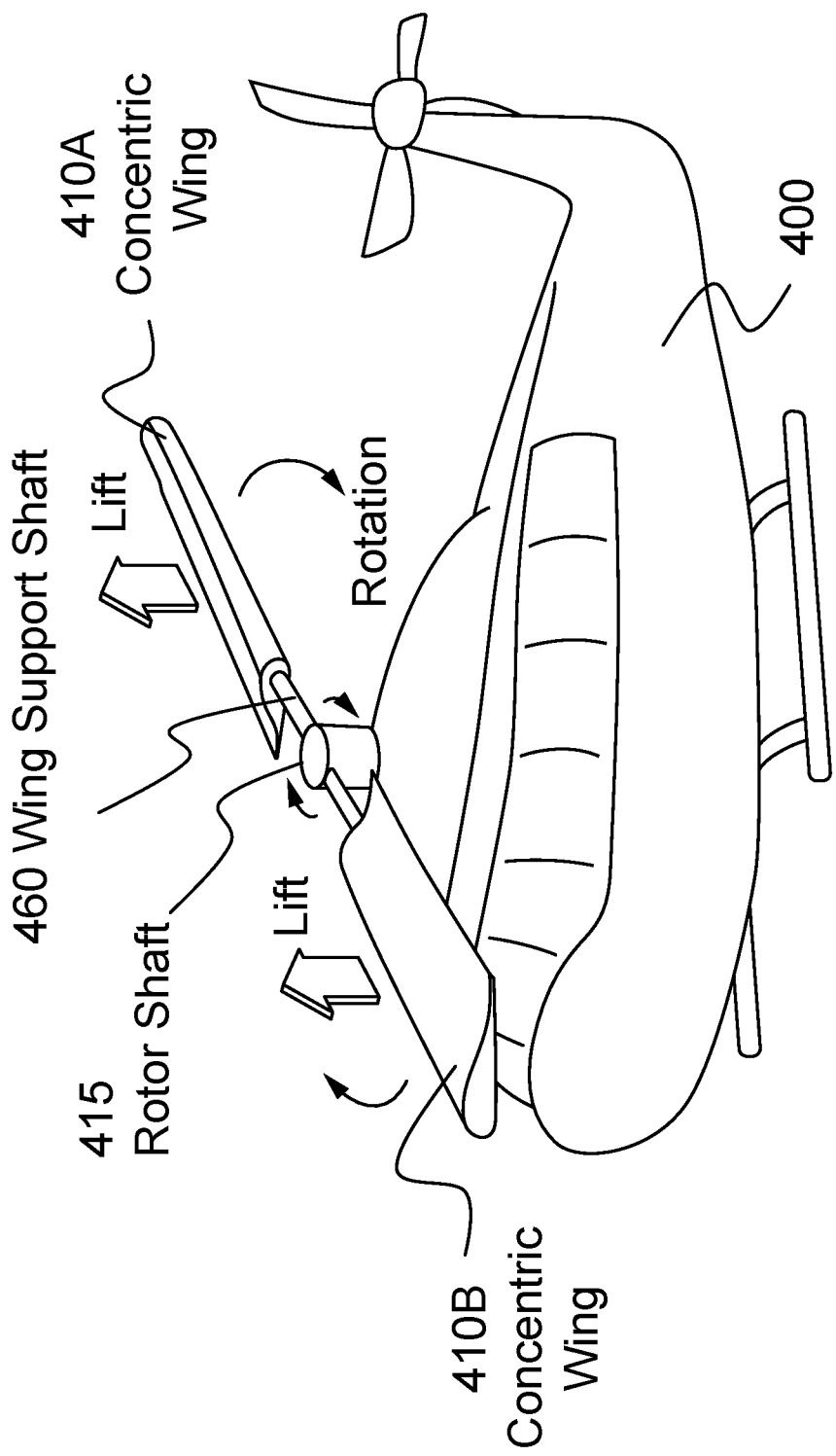
Figure 4A. Rotating In-Line Concentric Wing Turbines are similar to Helicopter Rotor Blades

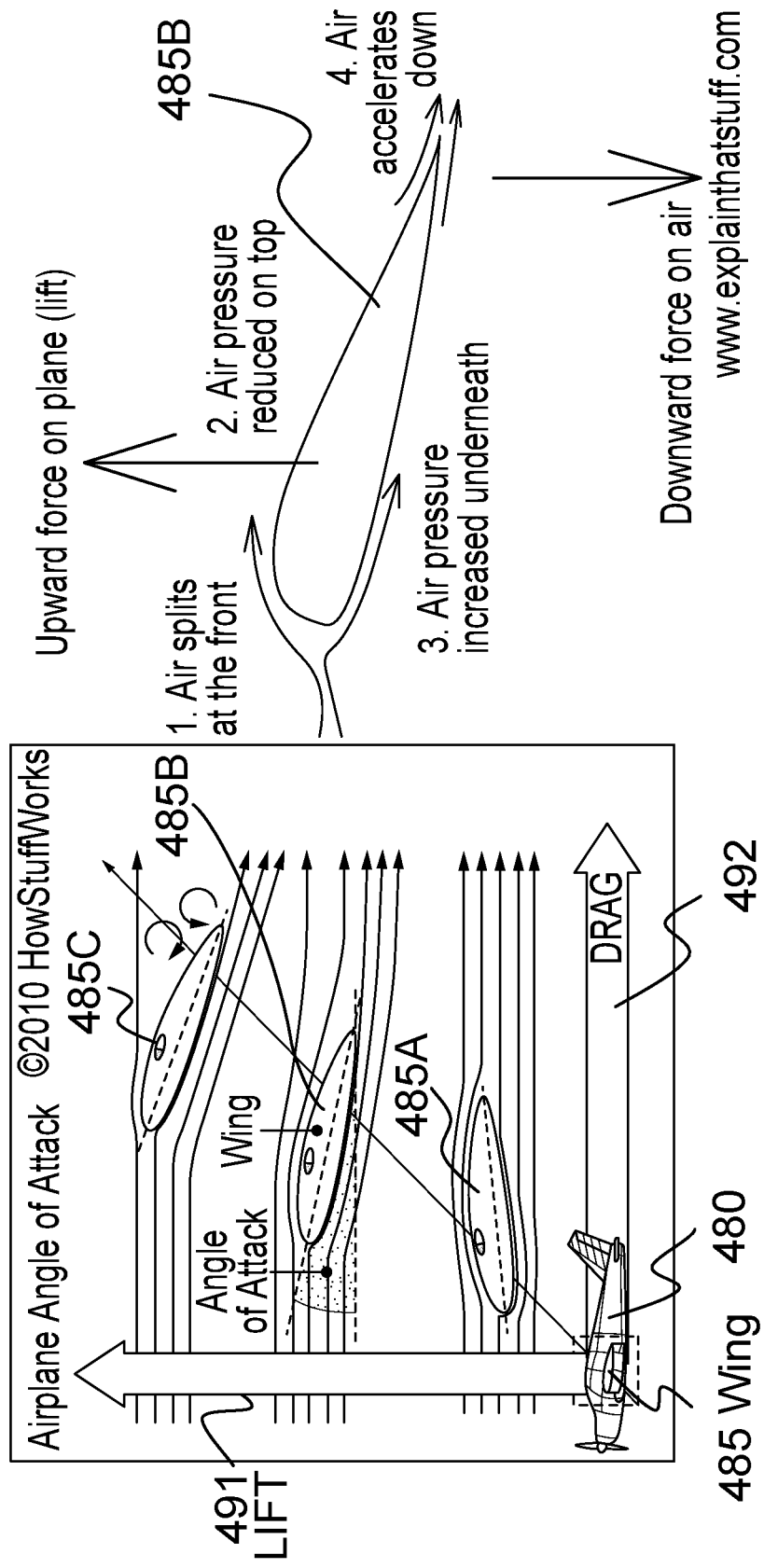
Figures 4B1- 4B2. Upward force (Lift) and downward force created by wings
PRIOR ART

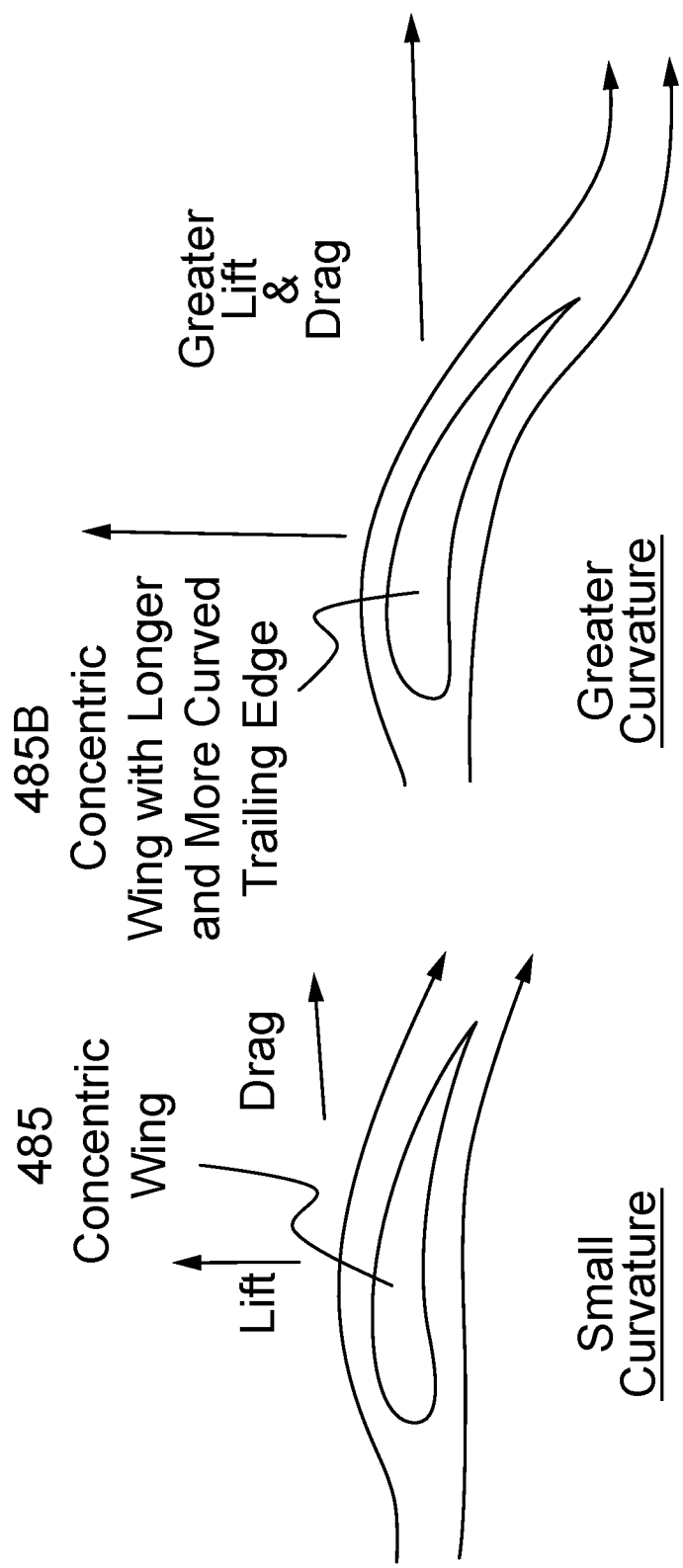
Figure 4C1: Lesser Lift & Drag    Figure 4C2: Greater Lift & Drag
Figures 4C1 - 4C2. Lift and Drag of Turbine Wings
PRIOR ART

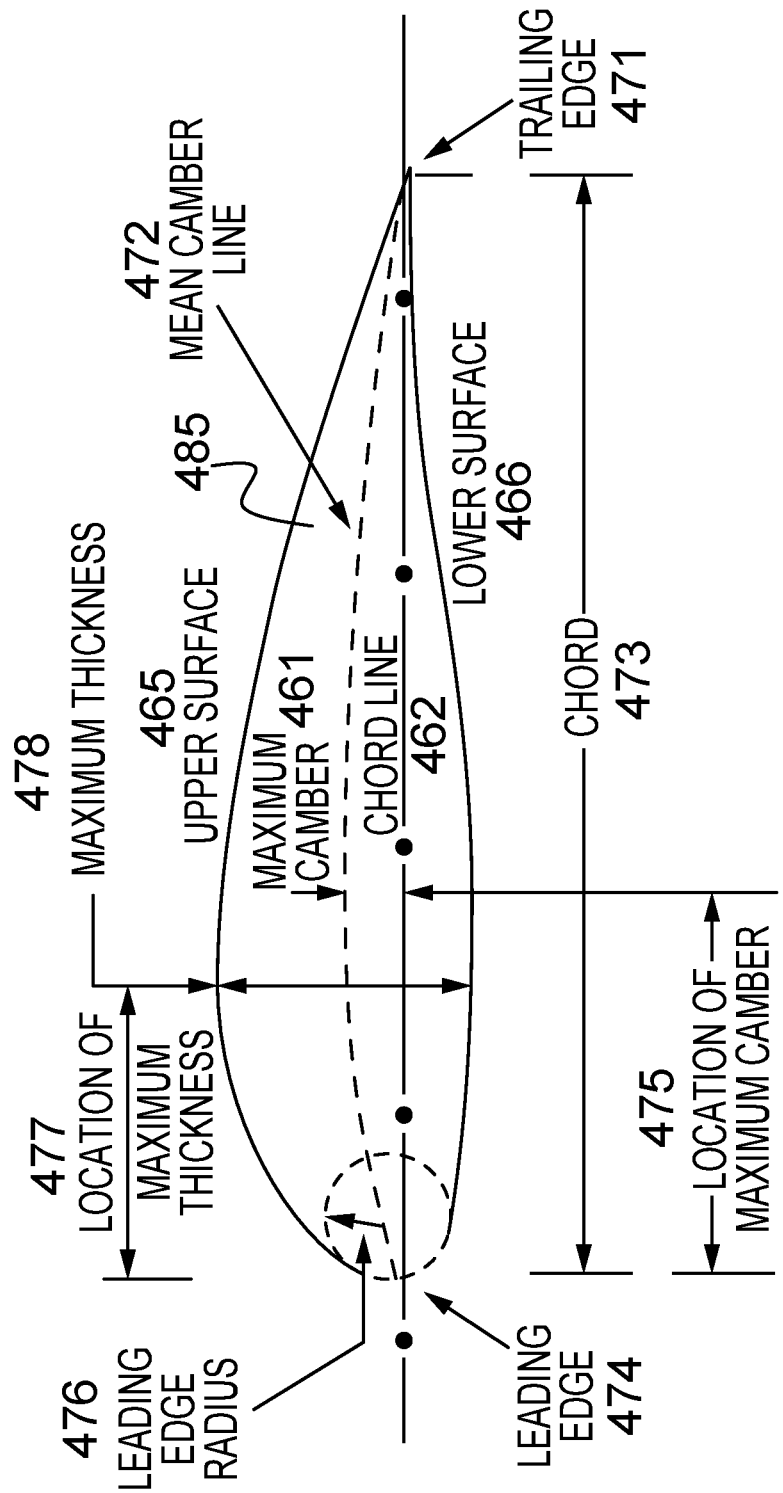
Figure 4C3. Description of (Airplane) Concentric Wing Profile
PRIOR ART

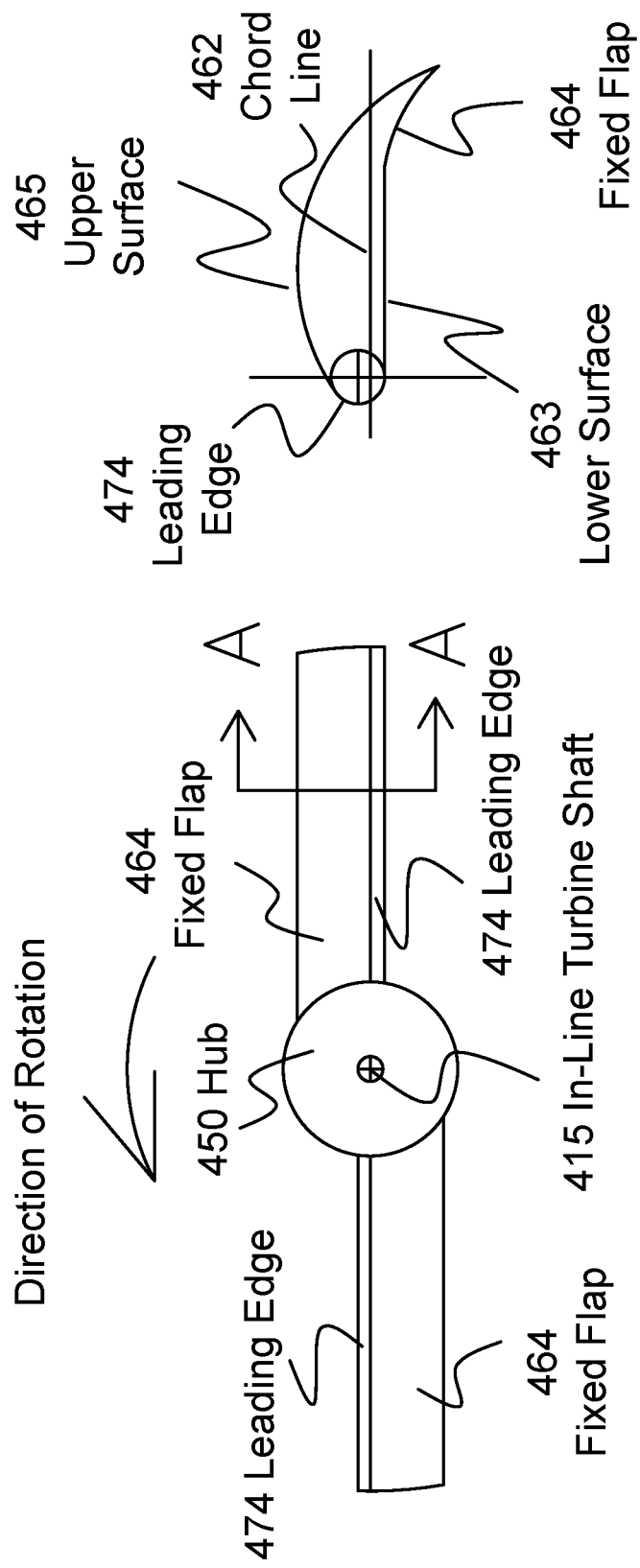
Figures 4D1 - 4D2. Uni-Directional Concentric Wing Turbines: Greater Lift and Drag. "N" number of pairs of Concentric Wings.

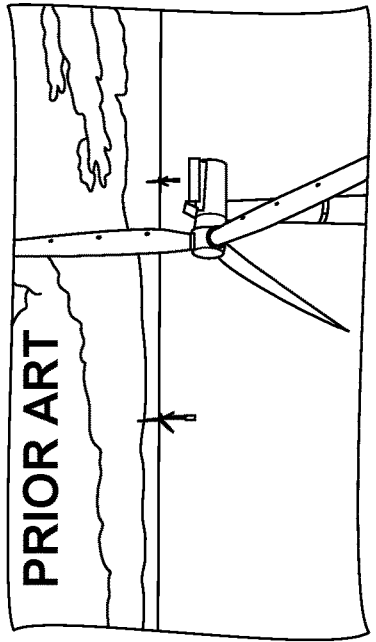

Fig. 5A. Air or Water flow direction referenced to X, Y, and Z-Axes

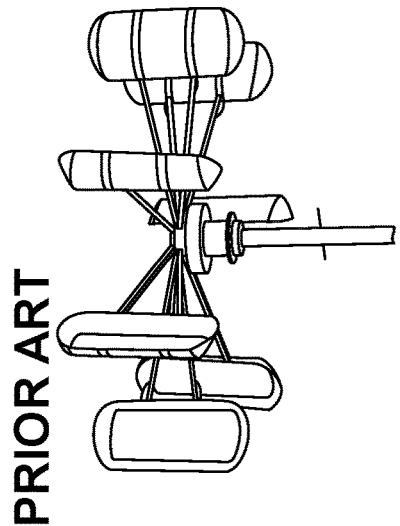

Fig. 5B. X-Axis (In-Line with air flow): Turbine shaft is in-line with air flow direction

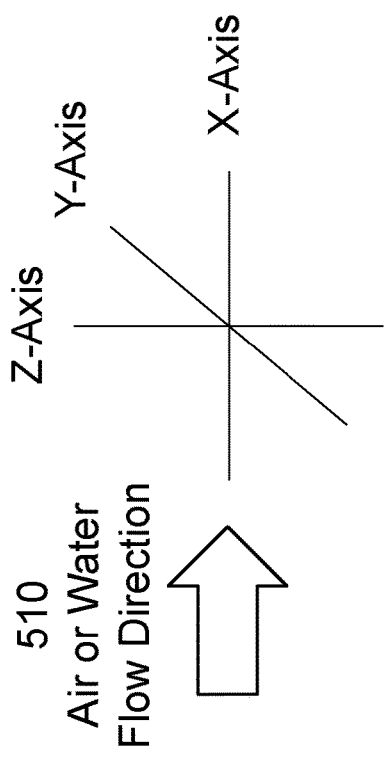

Fig. 5C. Y-Axis (Horizonal Crossing): Turbine shaft is horizontally orthogonal to water flow direction

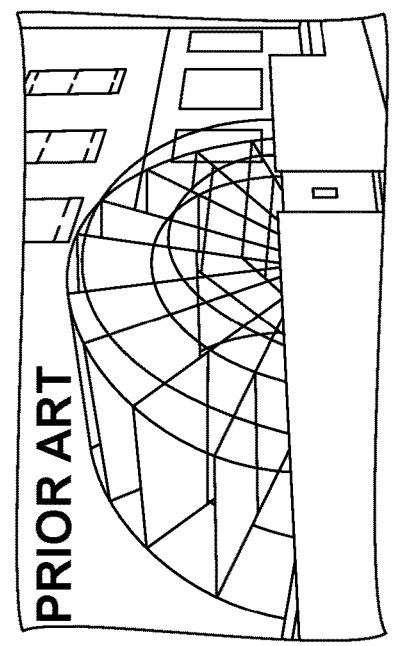

Fig. 5D. Z-Axis (Vertical Crossing): Turbine shaft is vertically orthogonal to air flow direction Figs. 5A-5D. Examples of Turbine relative to Flow Direction of Air or Water Flow

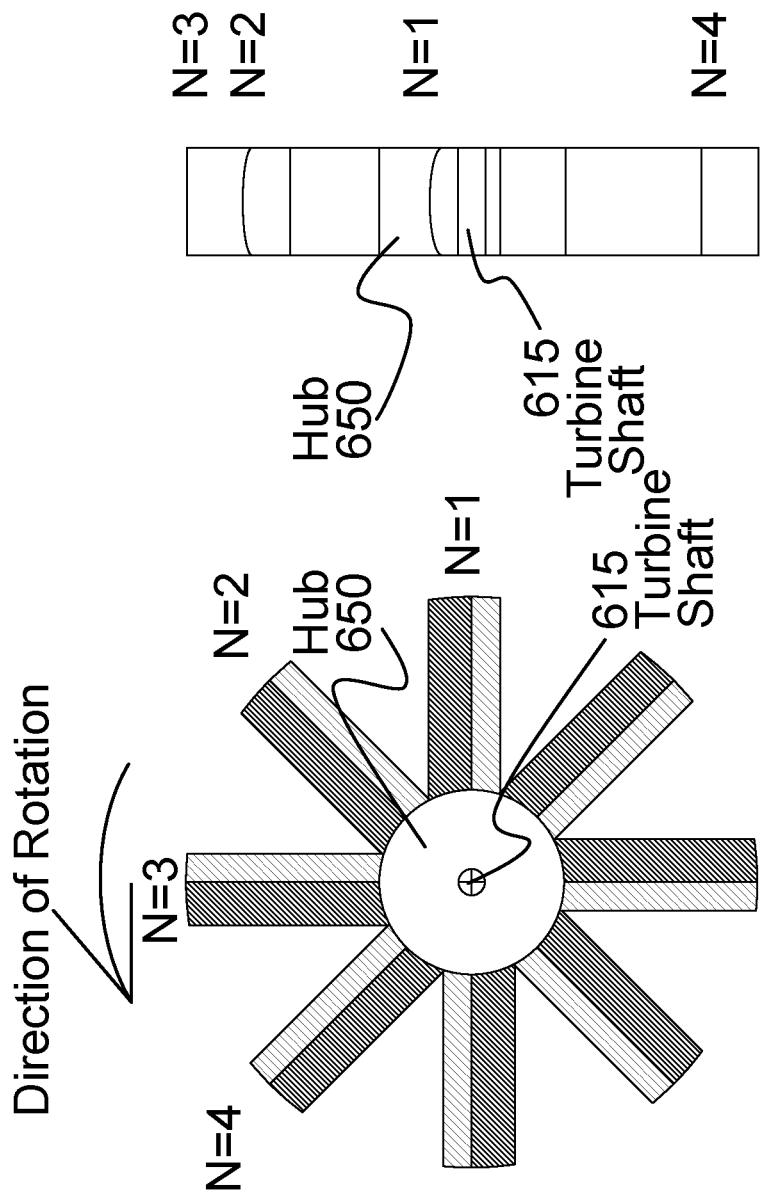
Figure 6A: Front View
Figure 6B: Side View
Figures 6A-6B. Multiple Sets of Concentric Wings on a Plane where "N" equals 4 pairs of opposing concentric wings

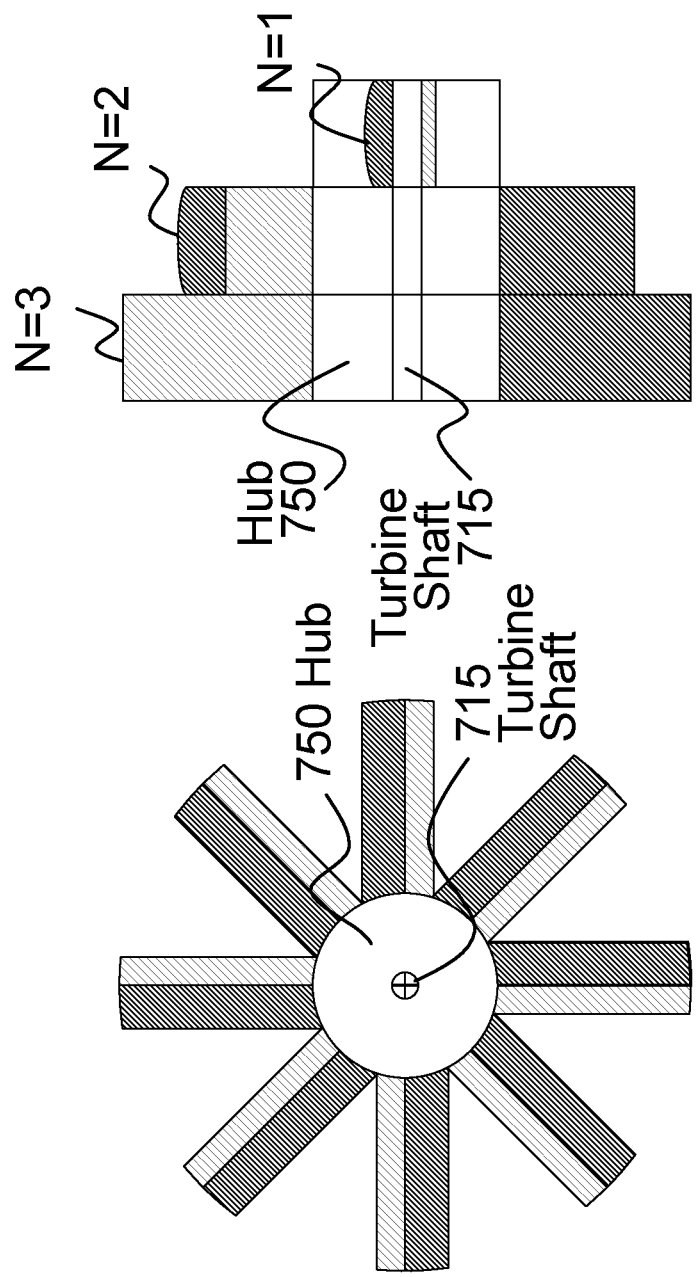
Figure 7A. Front View
Figure 7B. Side View
Figures 7A-7B. Multiple Sets of Concentric Wings on Multiple Planes

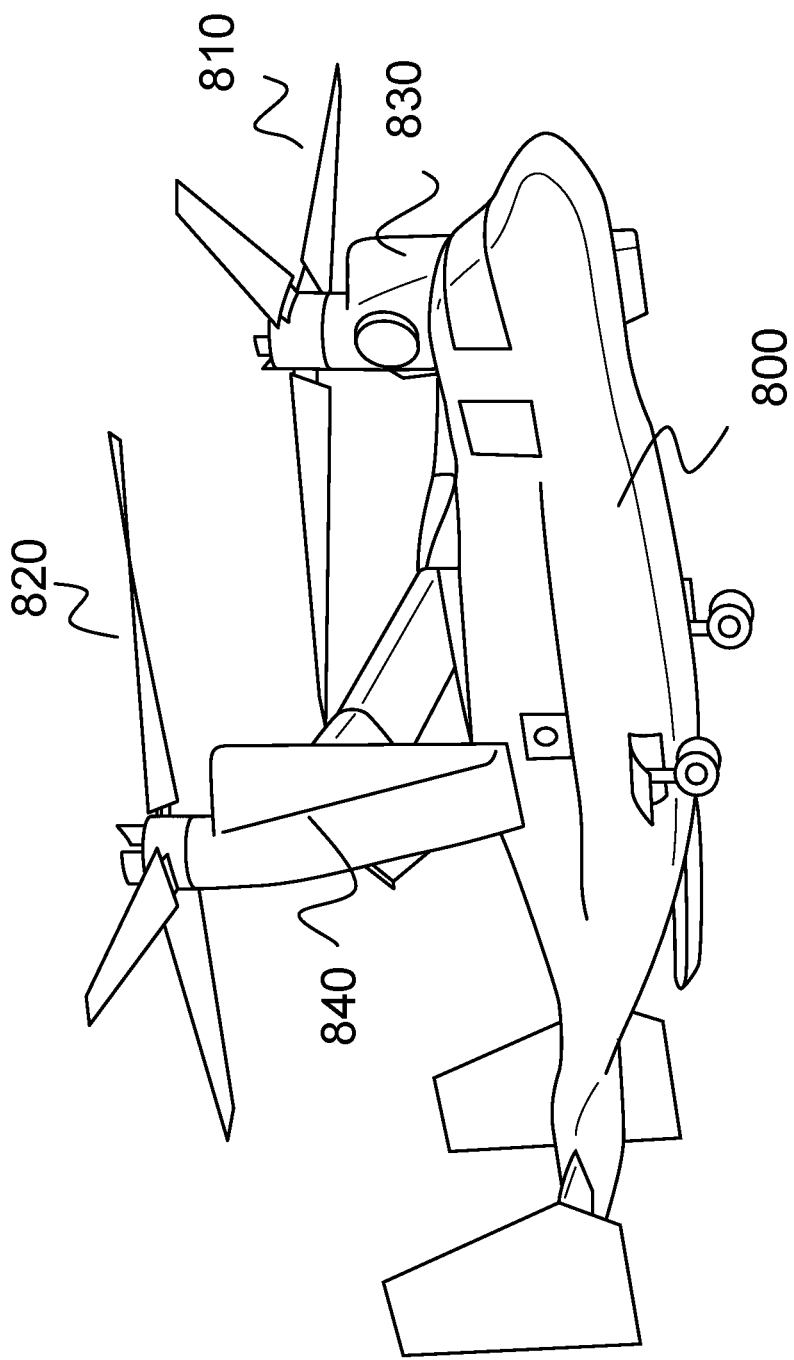
Figure 8A. Bi-Directional Osprey Fly Forward or Up & Down
PRIOR ART

Fig. 8A1 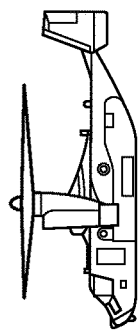
Fig. 8A4 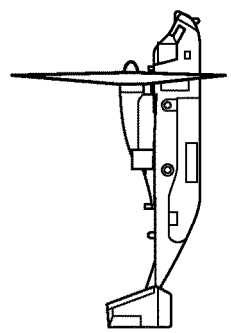
Fig. 8A2 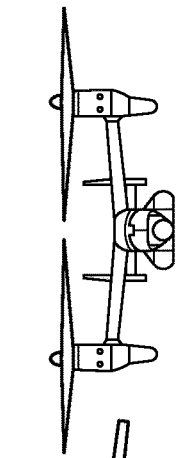
Fig. 8A5 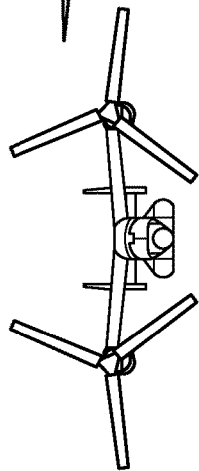
Fig. 8A3 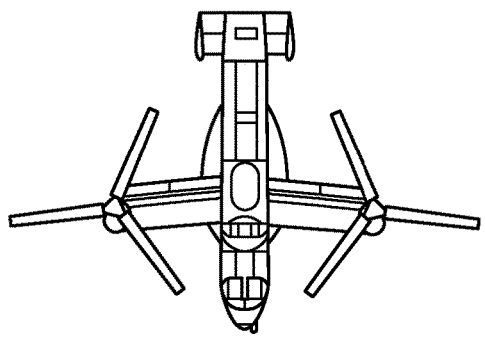
Fig. 8A6 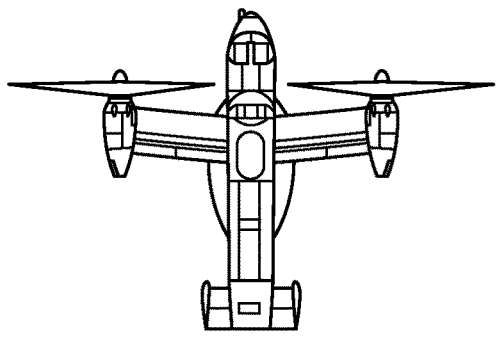
Figs. 8A1-8A6. Bi-Directional Bell Boing V-22 Osprey. Fly Forward or Up & Down
PRIOR ART

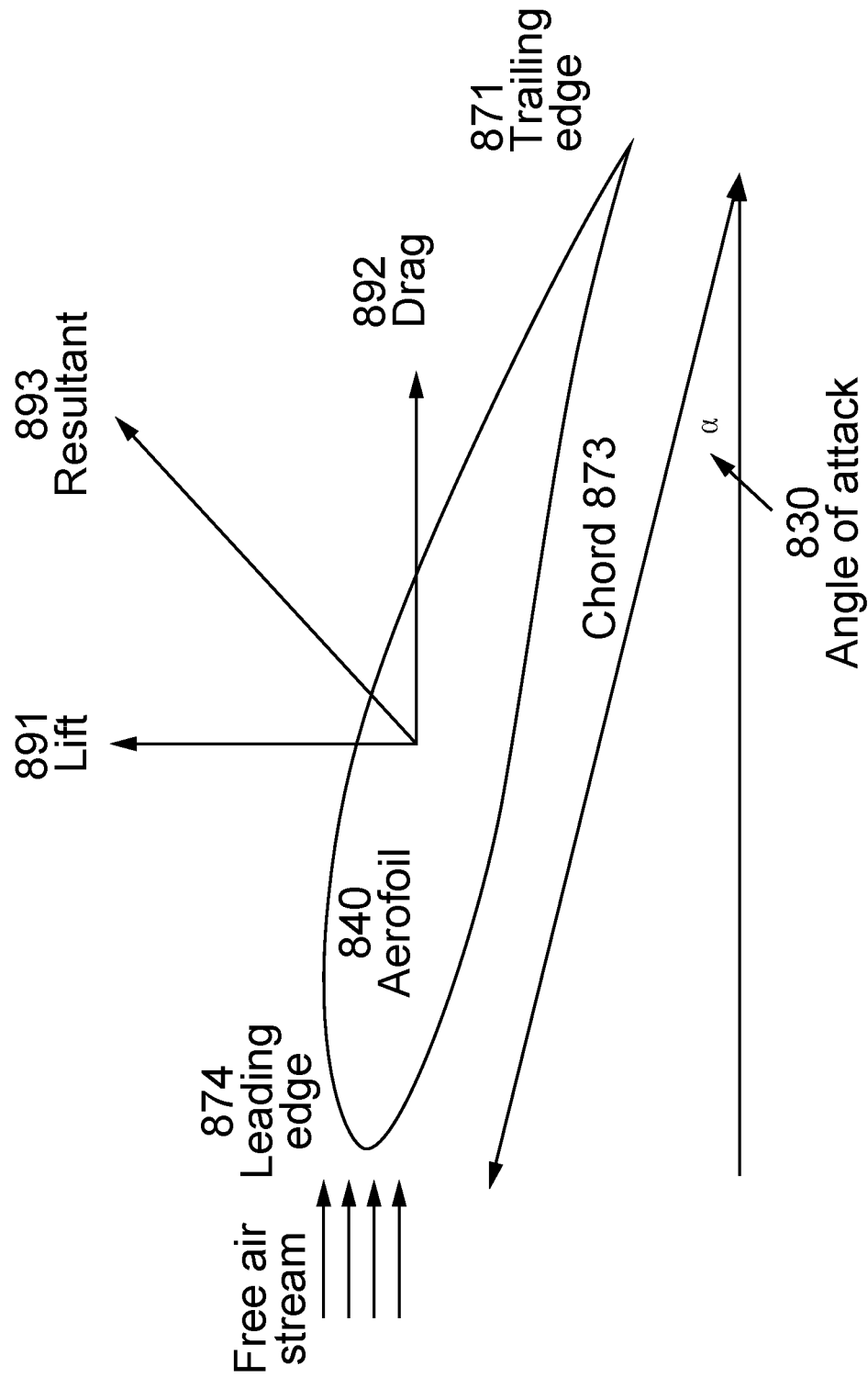
Figure 8B. Bi-Directional Tidal Turbines
PRIOR ART

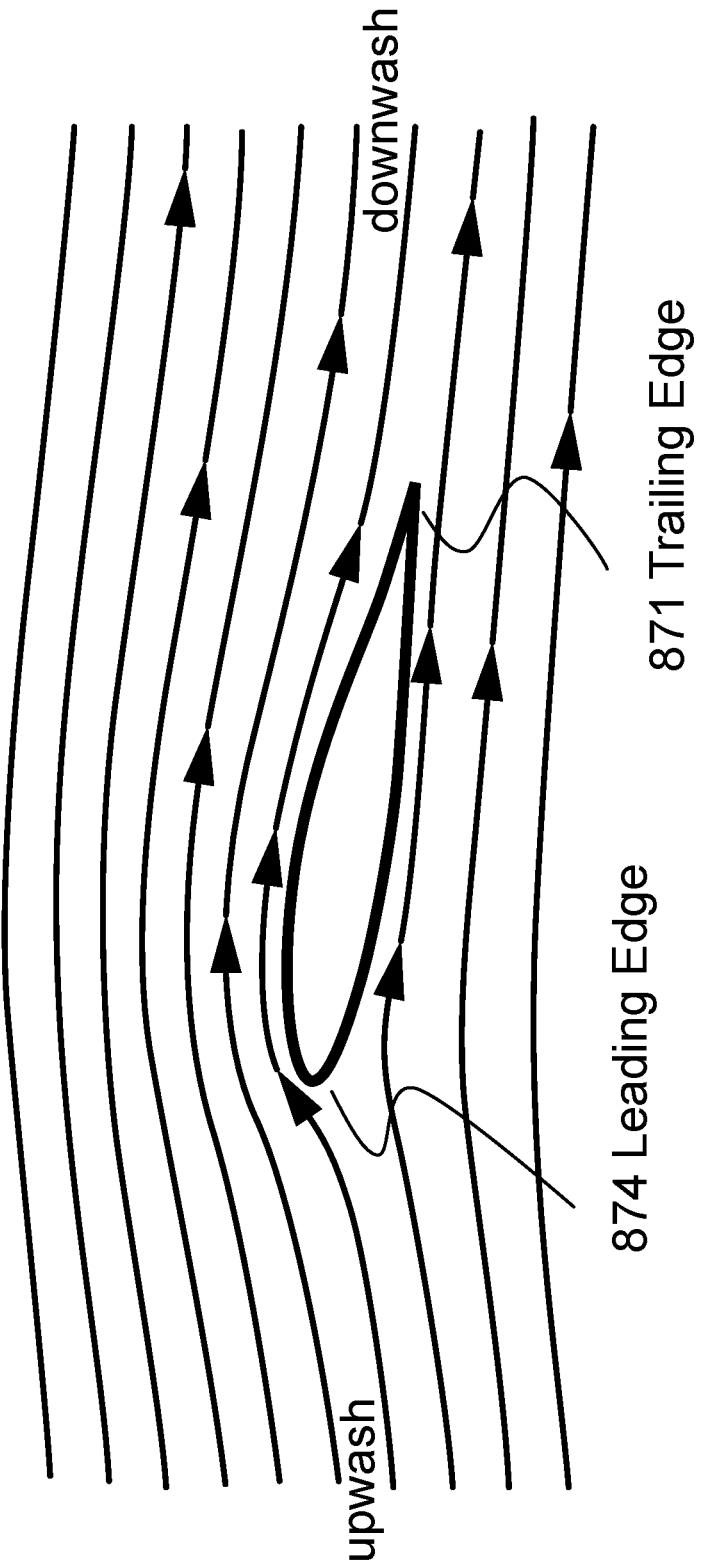
Figure 8C. Bi-Directional Tidal Turbines Upwash and Downwash
PRIOR ART

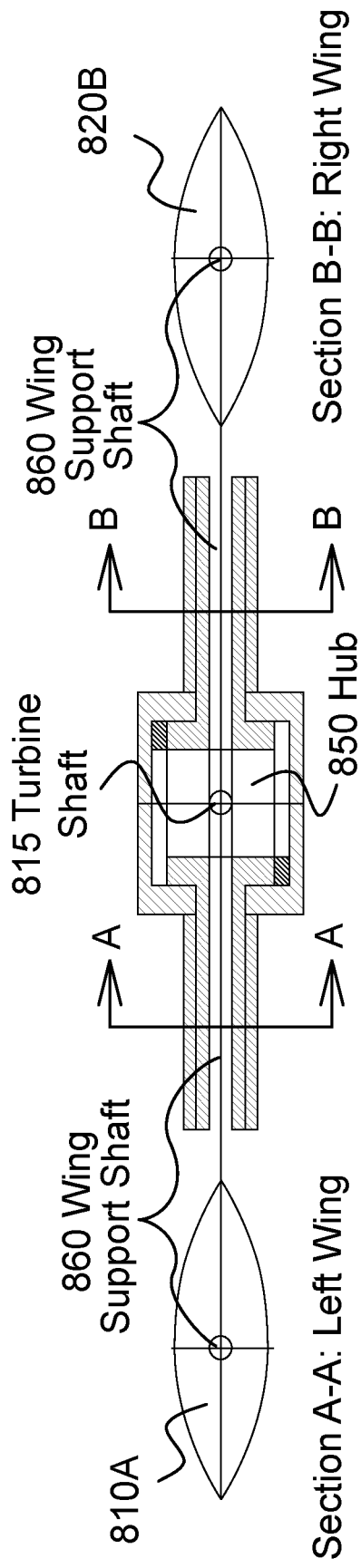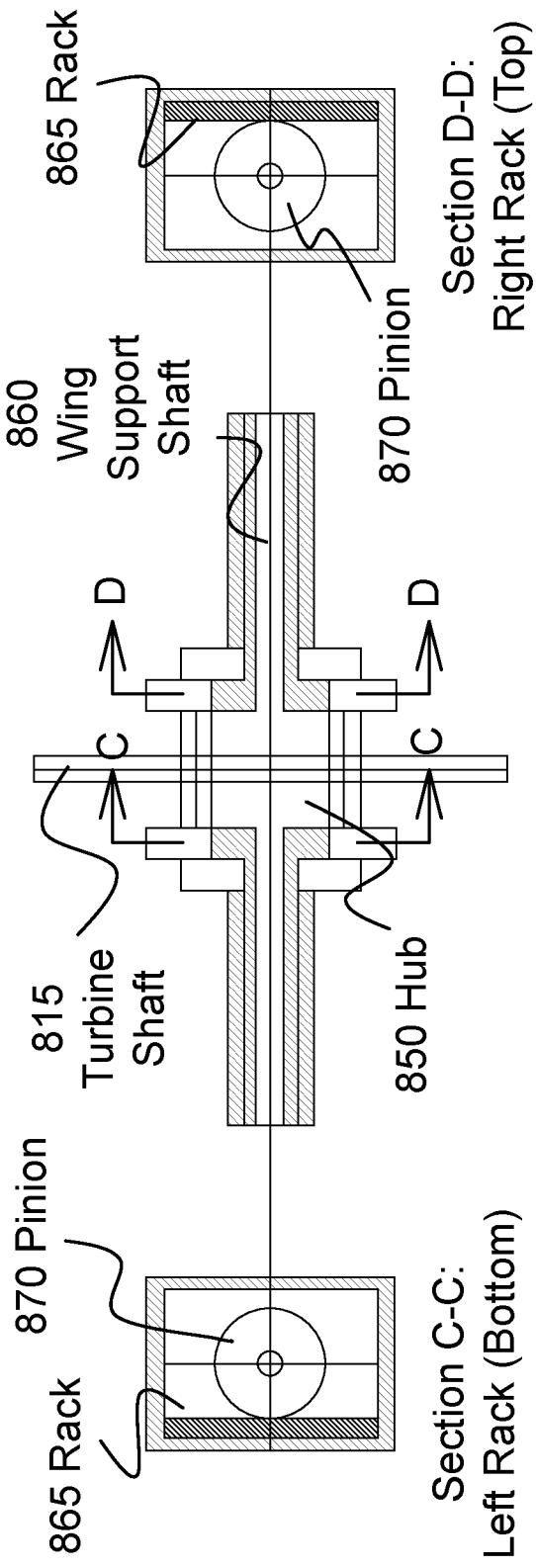
Figures 8D1 - 8D2. Bi-Directional Wing Turbines. Rack & Pinion Actuated

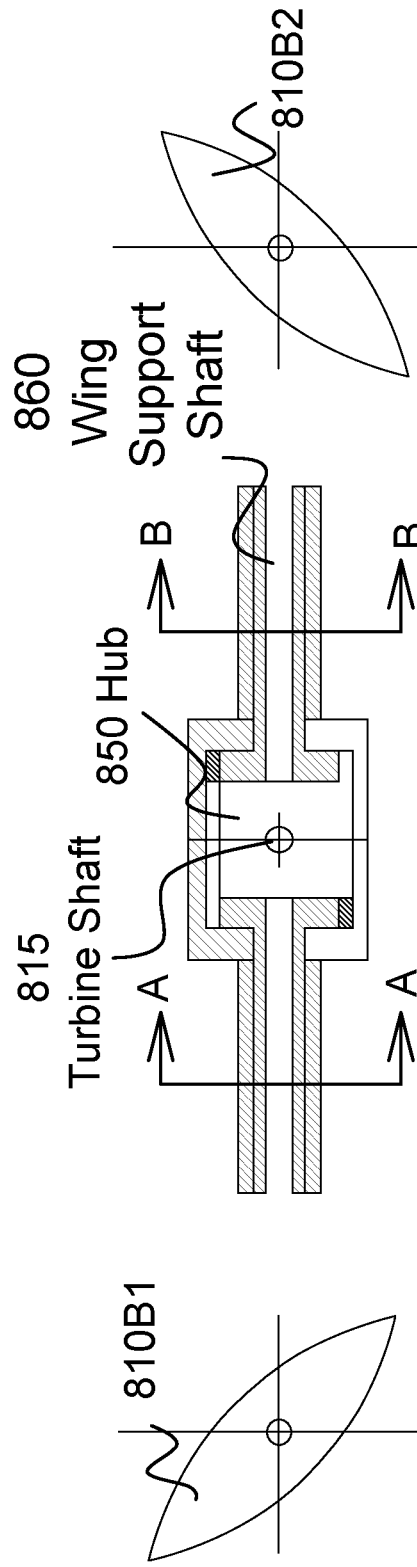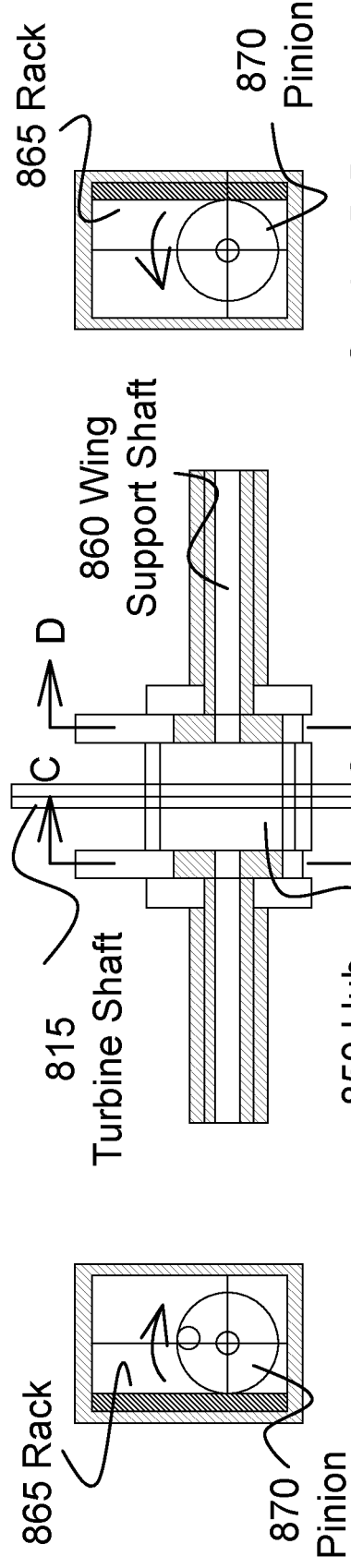
Figures 8D3- 8D4: Bi-Directional Wing Turbines. Rack & Pinion Actuated

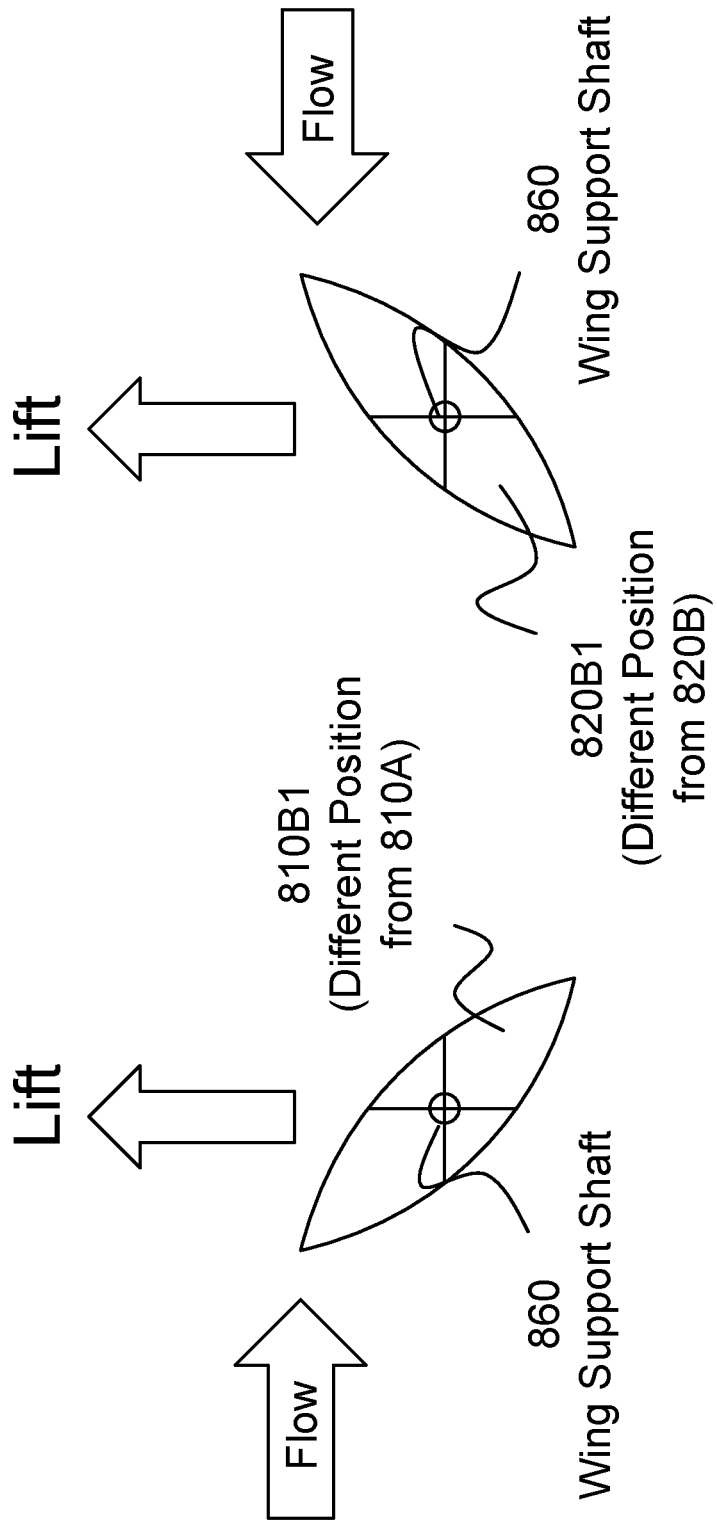
Figure 8D5: Flow from Left to Right   Figure 8D6 Flow from Right to Left
Figures 8D5- 8D6. Bi-Directional Wing Turbines:
Rack & Pinion Actuated

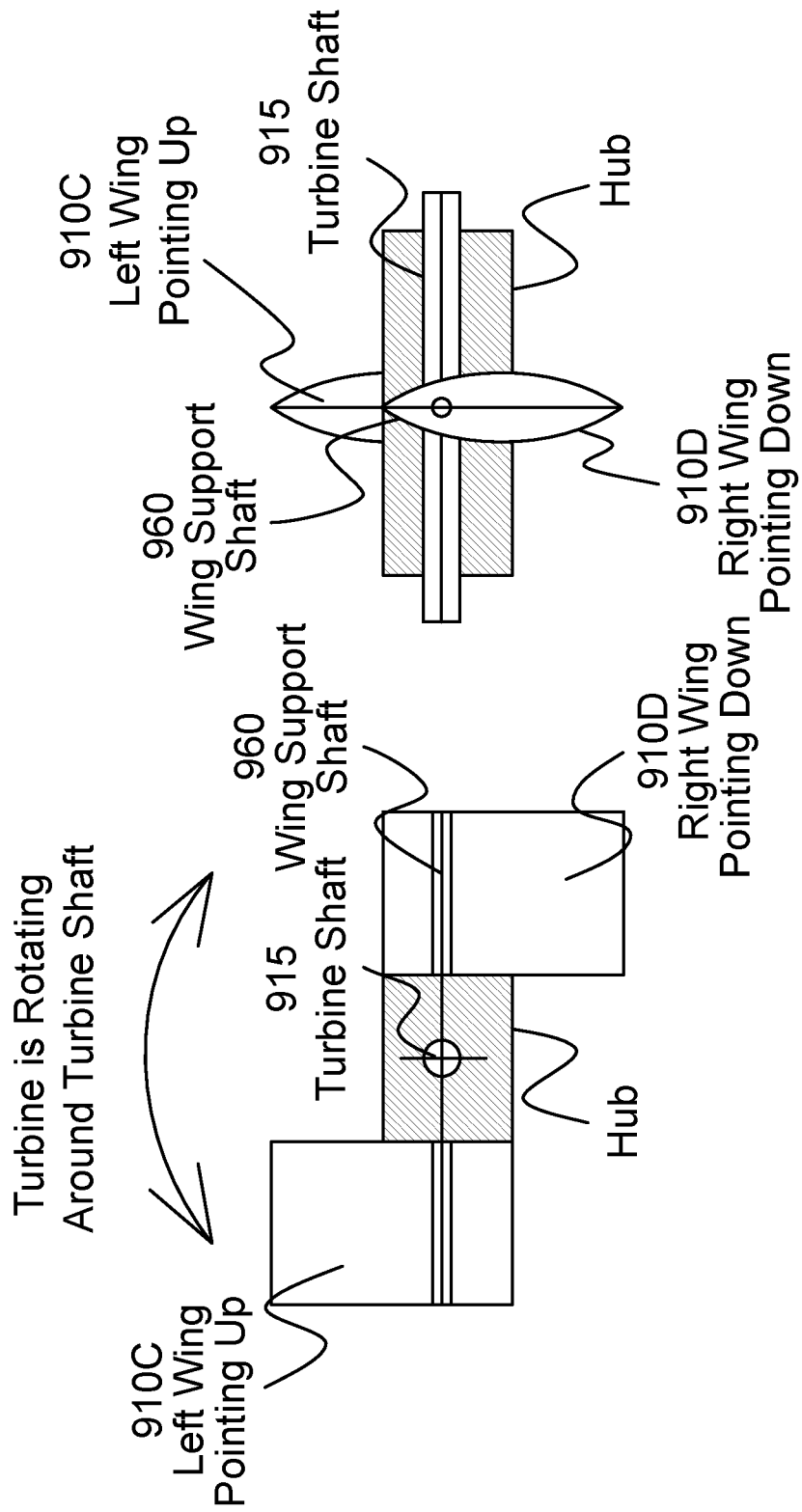
Figure 9A: Front View   Figure 9B: Right Side View
Figures 9A and 9B: Bi-Directional Concentric Wing Turbines

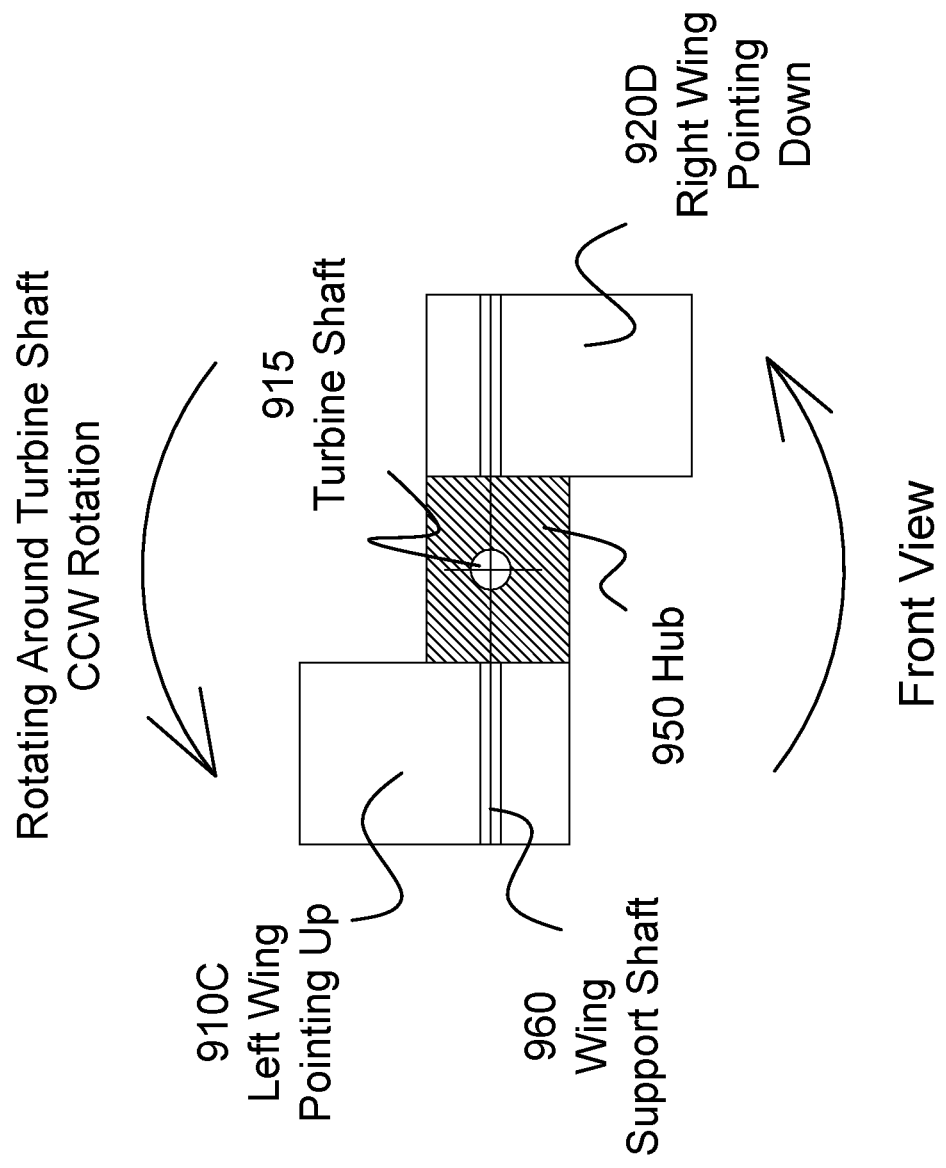
Figures 9A1. Bi-Directional Concentric Wing Turbines

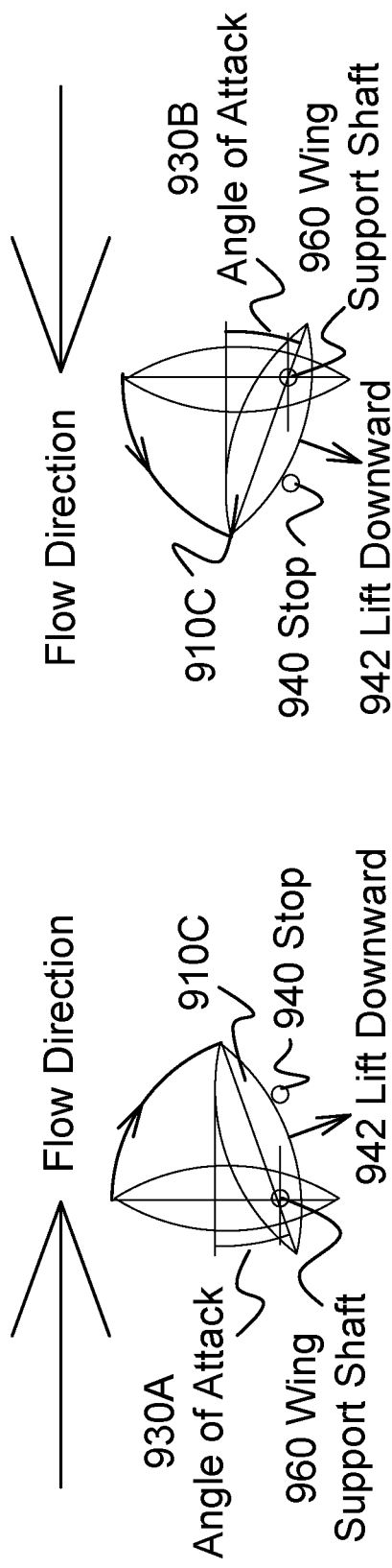
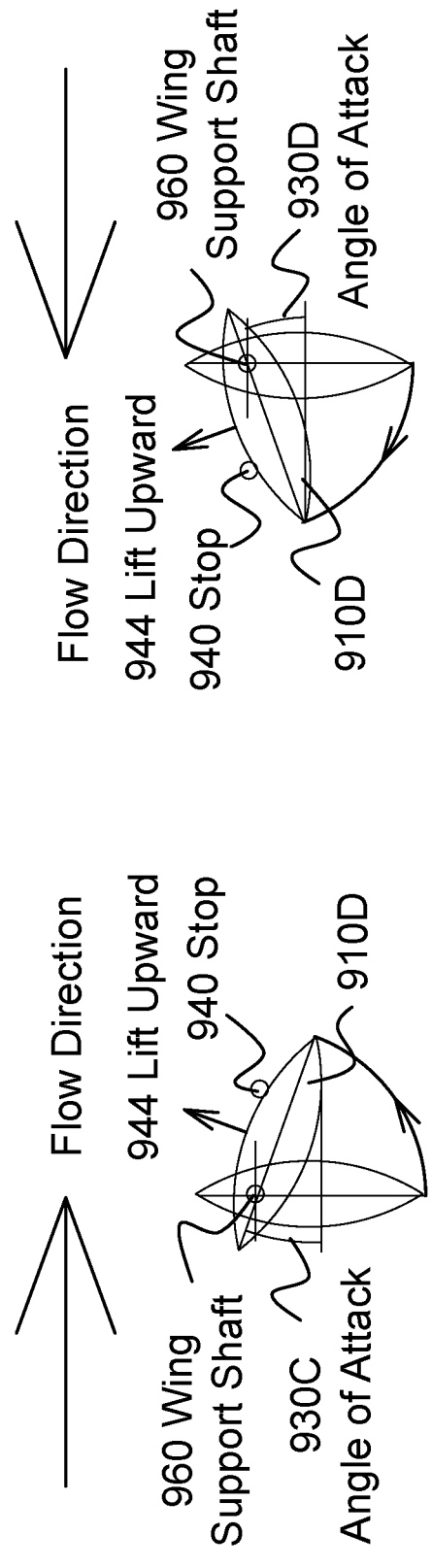
Figures 9B1 through 9E1. Bi-Directional Concentric Wing Turbines

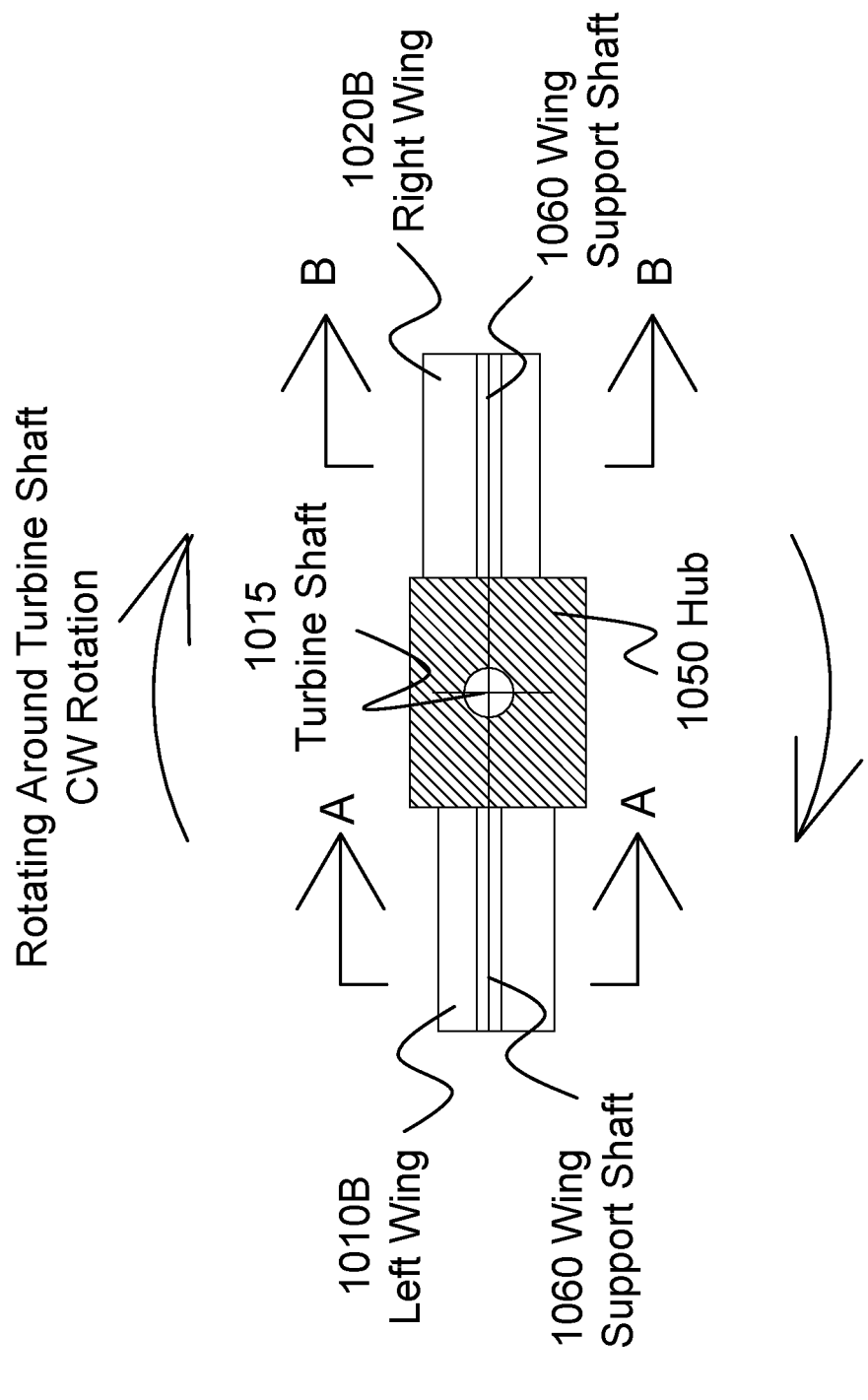
Figure 10A. Front View of Bi-Directional Concentric Wing Turbines: Wind or Water flow into the page

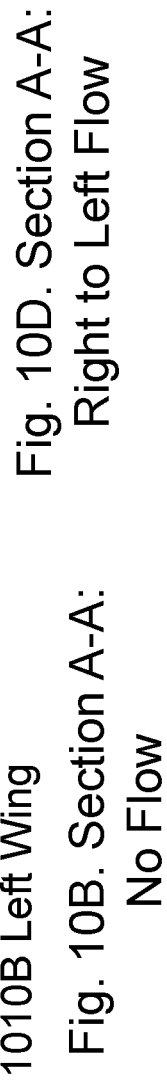

Flow Direction 1040-1 Stop

Fig. 10C. Section A-A: Left to Right Flow

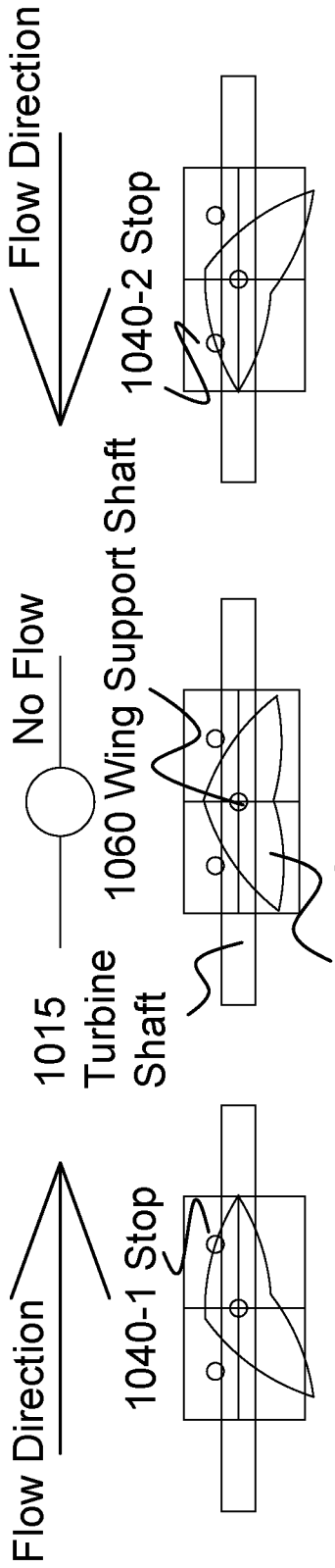

No Flow

1060 Wing Support Shaft

1015 Turbine Shaft

1010B Left Wing

Fig. 10B. Section A-A: No Flow

Flow Direction 1040-2 Stop

Fig. 10D. Section A-A: Right to Left Flow

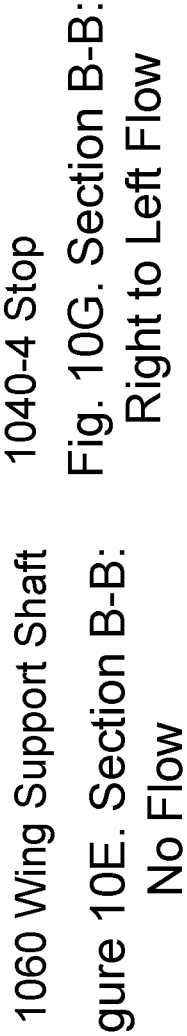

Flow Direction 1040-3 Stop

Fig. 10F. Section B-B: Left to right Flow

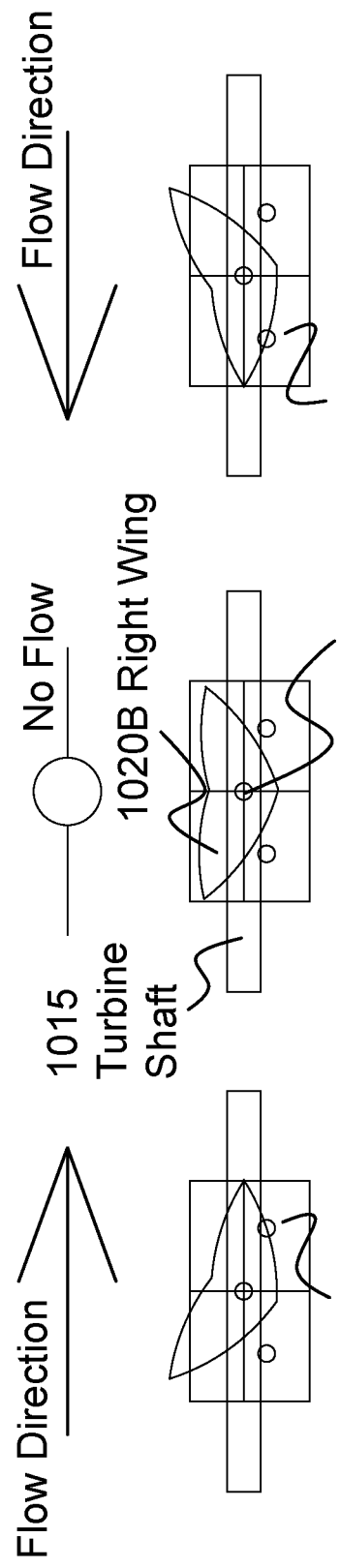

No Flow

1020B Right Wing

1015 Turbine Shaft

1060 Wing Support Shaft

Figure 10E. Section B-B: No Flow

Flow Direction 1040-4 Stop

Fig. 10G. Section B-B: Right to Left Flow

Figures 10B-10G. Bi-Directional Concentric Wing Turbines

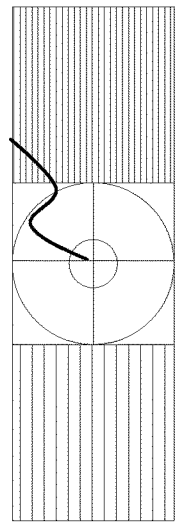
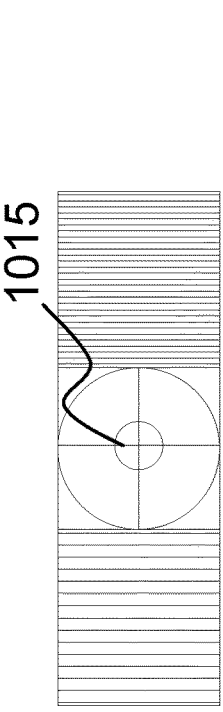
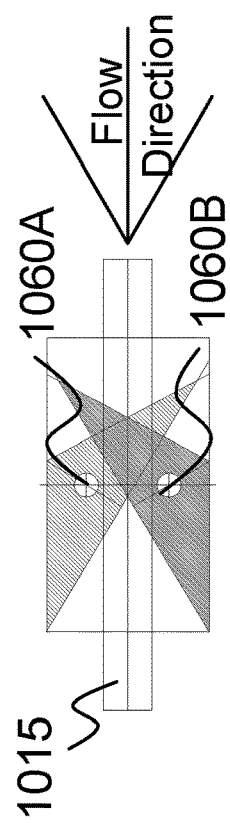
Figure 10B1: Side View. No Flow
Figure 10D1: Side View. Flow from L to R.
Figure 10F1: Side View. Flow from R to L.
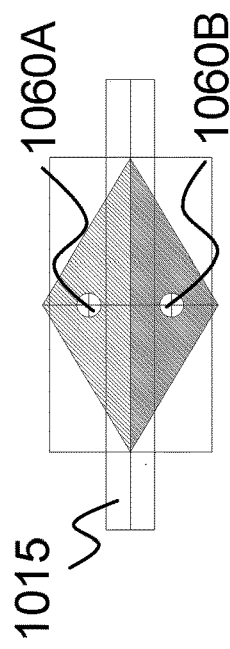
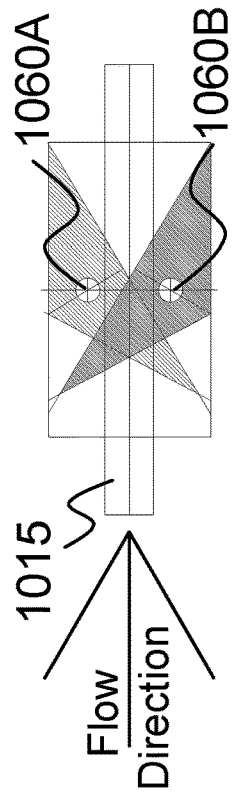
Figure 10A1: Front View. No Flow.
Figure 10C1: Front View. Flow from Left to Right.
Figure 10E1: Front View. Flow from Right to Left.
Figures 10A1 through 10F1: Concentric Wing Turbines

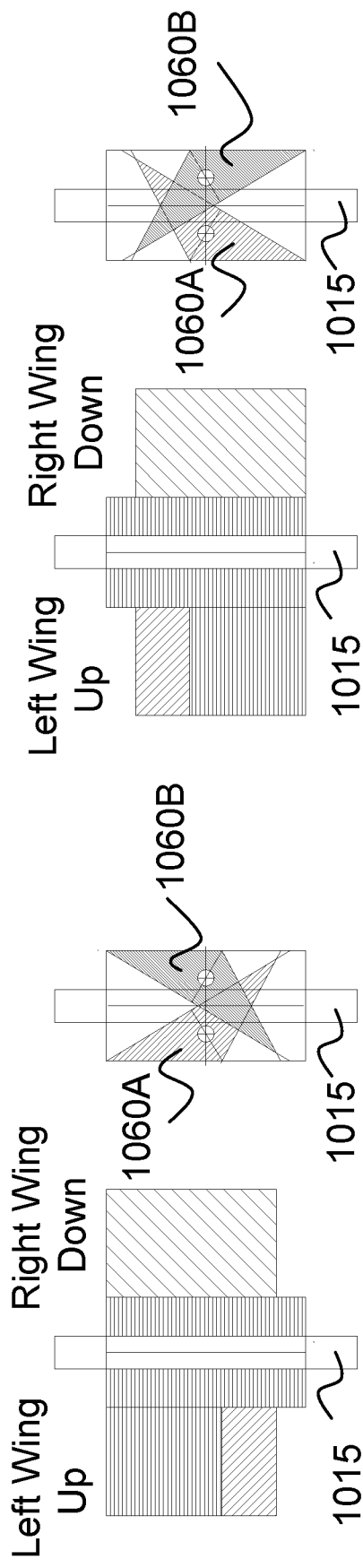
Figures 10G1 through 10N1: Concentric Wing Turbines

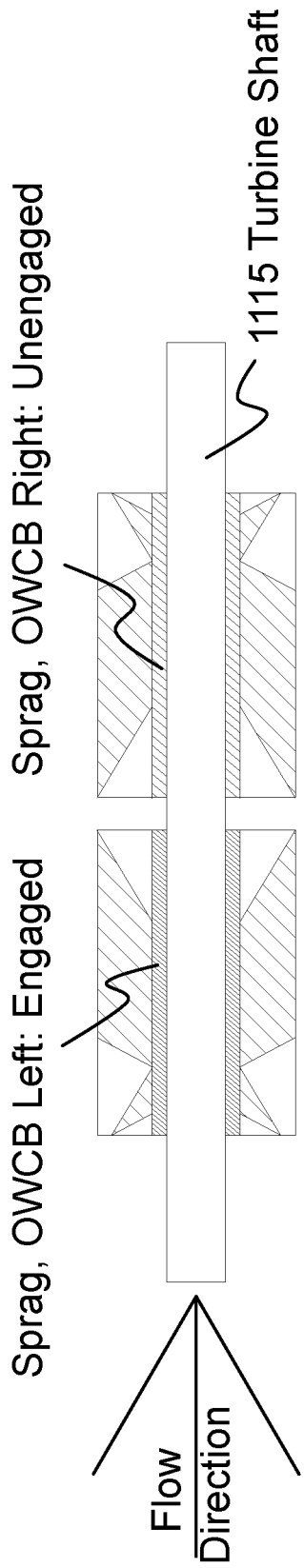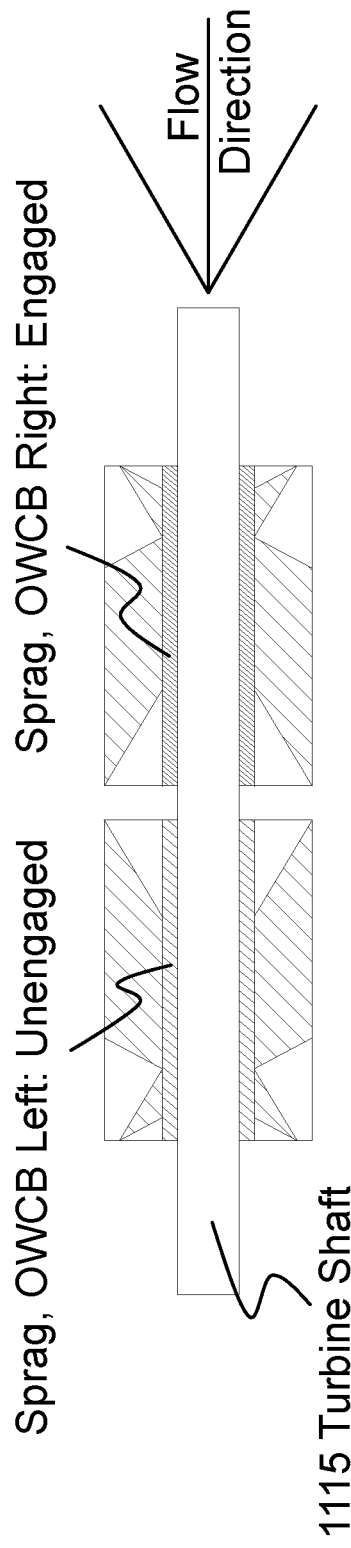
Figure 11A: Flow from Left to Right, Shaft rotates CW
Left Turbine Wing rotates CW and Right Turbine Wing rotates CCW
Figure 11B: Flow from Right to Left, Shaft rotates CW
Left Turbine Wing rotates CCW and Right Turbine Wing rotates CW
Figures 11A and 11B: Two Sets of Counter Rotating Fixed Wing Turbines

CONCENTRIC WING TURBINES

This application is a continuation-in-part of U.S. patent application Ser. No. 16/233,365 filed Dec. 27, 2018 and claims the right of priority to U.S. Provisional Patent Application Ser. No. 62/779,683 filed Dec. 14, 2018 by Kyung Soo Han, all priority patent applications being incorporated by reference matter as to their entire contents.

TECHNICAL FIELD

The field of the invention relates to the paddles, blades, propellers, buckets, sails or wings of wind, river, tidal or ocean wave turbines for generating electricity from renewable air and water energy and, more particularly, to a wind or river turbine similar to an airplane wing for harnessing wind or water energy in-line with the direction of flow of wind or water.

BACKGROUND

There are three components of a wind or river turbine for generating electricity: a harnessing module, a controlling module and a generating module. The harnessing module is for harnessing the renewable energy from the flow of air and water from, for example, river flow, air movement, tidal changes, ocean currents, wave motion and other air and water energy. Medium to high speed wind flow is typically stronger at the top or side of a hill than in a valley. Also, studies show that due to climate change, wind speeds have been increasing in recent years. A paddle, blade, propeller, bucket, sail or wing are known to capture or harness energy of the wind, the river, the ocean or tidal energy of tidal currents and changing tides. Water has a higher density than air and so creates greater torque than the same flow of air at the same speed. Referring briefly to FIG. 5A, air or water flow direction is typically horizontal or along an X axis. The paddle wheel, for example, shown in FIG. 5C, has a turbine shaft that crosses the water flow direction in a Y-axis and is known to propel a river boat forward has been used to capture river energy (in the photo example, a turbine shaft for powering a mill). A shaft supporting a paddle wheel is mounted horizontally and is horizontally orthogonal to the flow of water when the mill is driven by the paddle wheel (or in the case of a river boat, is traveling up or down stream). A propeller/blade is known, per FIG. 5B, and has been known to capture wind, river or ocean current energy from air flow directed at the propellers. A propeller turbine shaft is typically mounted to face the direction of water flow per FIG. 5B. Referring briefly to FIG. 4, the propeller shaft is in the direction of air or water flow shown as the X-axis. The paddle wheel shaft is in the Y-axis and horizontally crosses the X-axis. The design of a turbine is also known to utilize the vertical Z-axis which vertically crosses the X and Y axes in a horizontal plane. A known example of a wind propeller is shown in FIG. 5B (in-line with air flow, the X-axis). A known example of a paddle wheel is shown in FIG. 5C (horizontally orthogonal to water flow, the Y-axis). A known example of a vertical turbine shaft vertically orthogonal to the air flow direction is shown in FIG. 5D (vertically crossing the X- and Y-axes in the horizontal plane), the Z axis.

A controlling and generating module and some concepts of a harnessing module are to be found in the following U.S. Patent and pending patent applications of Kyung Soo Han which are to be considered incorporated by reference as to their entire contents: U.S. patent application Ser. No. 15/267,655 filed Sep. 16, 2016 issued as U.S. Pat. No. 9,912,209; U.S. Ser. No. 15/707,138 filed Sep. 18, 2017, entitled Commutator-less and Brush-less Direct Current Generator and Applications for Generating Power to an Electric Power System and issued as U.S. Pat. No. 10,378,506; U.S. Ser. No. 15/883,927 filed Jan. 30, 2018 entitled Control Apparatus and Method for Variable Renewable Energy and U.S. Ser. No. 16/134,595 filed Sep. 18, 2018 for River and Tidal Turbine with Power Control. Moreover, U.S. patent application Ser. No. 16/233,365, filed Dec. 27, 2018, should also be considered incorporated by reference as it provides recently developed material directed to the control and generating modules and shows a known harnessing module (a waterwheel) for harnessing river, tidal and ocean current energy.

It is an object of the present invention to study the application of wings typically used for flight in the form of a wing or helicopter blade to determine if such aircraft wings may be of interest for forming a harnessing module of a turbine for generating electricity from renewable sources of air and water energy. Applicant has also studied the principles of an airfoil and the possibility of developing fixed and rotatable wings for harnessing uni-directional river energy and for bi-directional tidal and ocean wave energy.

Problems of prior art harnessing modules include the use of a hatch to control, for example, speed of a waterwheel, the large side and volume of noise generated by known wind turbine propellers and the need to adapt the support structure such as a platform to both support the turbine and the control and generating modules above a river and a harnessing module, for example, below a river turbine complicates the design of a river turbine; see, for example, prior art FIGS. 2A, 2B, 3A and 3B). A water flow turbine comprises a controlling module and a generating module on top of the platform while permitting a harnessing module to be mounted under the platform. In the alternative, a water flow turbine may be mounted, for example, on a platform secured to a river bottom or on a floating platform tethered in place on the river. A concentric wing turbine (CWT) is investigated as an option over existing harnessing modules, for example, waterwheels, paddles, blades, and propellers. Known propellers create thrust for a vehicle such as an airplane or helicopter to move forward or upward/downward through the air. Wings of airplanes in addition to propellers are creating lift for a vehicle/airplane to go forward/upward/downward. A known harnessing module comprises hatches and paddle wheels. There remains a problem in the art that suggests an analogy between the wing or propeller of an aircraft and a harnessing module of a hydrokinetic or wind turbine for generating electricity. A harnessing module should create rotation since the renewable energy flow (wind or water) is providing thrust.

SUMMARY OF THE EMBODIMENTS

A solution to the above-identified problems of developing wings for harnessing modules of variable energy power generators is a Concentric Wing Turbine (CWT). A CWT is a renewable energy harnessing module that consists of rotating wings that may be similar to helicopter rotor blades in multiples of N opposing pairs of wings where N is equal to or greater than one. The purpose of using concentric wings is harnessing high torque at controlled rotational speed with wider and concentrically shaped blades. The term "concentric" as used herein means sharing a common center, for example, a center of mass of a concentric wing or geometric center of a triangle (a shape used in some embodiments of a concentric wing). Once rotary energy is harnessed effectively, a speed converter developed by DDMotion can convert the harnessed speed/torque (energy) to grid quality electricity. The primary application of a harnessing module is for harnessing river energy that is flowing in one direction or tidal river energy that flows in two horizontal directions. Since turbines are fixed at a particular location, sometimes by ties to a river's borders or to their bottoms are harnessing rotary energy instead of moving the system (such as an airplane or helicopter) forward. Creating greater lift and drag is desirable in designing a wing/blade for a uni-directional flow of rotational energy in a harnessing module that may turn an electric generator. Another application is harnessing tidal (bidirectional) energy and wave energy. In this case, the direction of harnessed energy may be adapted to rotate a turbine shaft of a harnessing module in one direction. With changing tides, it is useful to apply a harnessing module capable of operating in two directions of the changing tides. For example, the East River of New York City changes direction twice a day as do tidal estuaries. Ocean waves exhibit two directional, up and down, movement and water flow. Energy may be harnessed by a similar bi-directional harnessing module adapted to turn a turbine shaft in one direction.

There are three types of turbines in reference to the flow of energy versus a rotational axis of the harnessing modules. The axis of the rotating shaft of Horizontal Axis Wind Turbine shafts are is in-line with the flow of air or water (X-axis), Vertical Axis Wing Turbines and wave turbines are vertical (Z-axis), and a paddle type waterwheel is horizontally perpendicular to being in-line (Y-axis); (see FIG. 4). Out of the three types, the in-line system is most effective without dead angles. A CWT preferably may have an in-line system. As will be discussed in the brief description of the drawings and the following detailed description, an airplane or helicopter wing (prior art) has been studied for the purpose of determining modifications of known wing that may be adapted for the use of harnessing river or wind energy that may be, in turn, input to a controlling module and to a generating module for outputting constant power at constant frequency to an electric grid.

BRIEF DESCRIPTION OF THE DRAWINGS

In the drawings, a convention is used where the first number of a reference numeral provides the figure number and an effort is made to use the remaining digits consistently for similar components reference in subsequent drawings. For example, turbine shaft 115 is shown in FIGS. 1A and 1B while turbine shaft 215 is shown in FIGS. 2A and 2B where turbine shaft component 115 is in-line with the water flow (X-axis) and turbine shaft 215 is horizontally perpendicular to the direction of water flow (Y-axis).

FIG. 1A is a front view and FIG. 2B is a side view of control and generating module assembly of an in-line platform river turbine comprising a generator 155, a control motor 135 and a speed converter 145 components mounted on a plate 192 of a floating platform 110 that may be tied to a river bottom or a river bank (or at least the harnessing module comprising concentric wings 120A-H and turbine shaft 115 may be in the water). Left and right pontoons 102A and 102B of FIG. 1A are not shown in FIG. 1B so water flows into the page in FIG. 1A and to the right in FIG. 1B turning concentric wings 120A-120H. Only concentric wing 120C is shown properly in FIG. 1B as concentric wings 120B and 120D should be shown at 45° angles as seen in FIG. 1A.

FIGS. 2A and 2B show side views of a prior art waterwheel assembly that may be guided by a paddle or vane 240 to receive water flow fro, either direction of water flow along the Y-axis.

FIG. 3A shows a front view of a prior art waterwheel 340 having protector bars 310, 320 for protecting the waterwheel (harnessing module) from floating debris (waterwheel 340 being hidden in FIG. 3A). Water flow is into the page through the protector bars 310 in prior art FIG. 3A FIG. 3B shows a side view of the prior art waterwheel 340 of FIG. 3A with water flowing from right to left (or from left to right). FIGS. 3A and 3B show bidirectional flow of water having hinged trap door control.

FIG. 4 shows a convention for X, Y and Z-axes relative to air or water flow direction, for example, from left to right air or water flow 410 (or up and down as in wave motion). The X-axis is in-line with water flow or air flow (wing) 410. The Y-axis horizontally crosses the in-line flow of wind or water. A vertical axis wind or water turbine may be in the Z-axis which vertically crosses the horizontal plane, X- and Y-axes.

FIG. 4A is a sketch of a hypothetical helicopter 400 having a pair of opposing concentric wings 410A and 410B which are opposite one another and rotating about a rotor shaft 415 (analogous to a turbine shaft) where the concentric wings 410A and 410B each have a wing support shaft 460.

FIGS. 4B1 and 4B2 are prior art figures demonstrating lift and drag on a known propeller-driven airplane with a pair of opposing airplane wings 485A-485C (side view) and the steps of producing upward (lift) and downward and slowing (drag) forces on the airplane wings respectively.

Prior art FIG. 4B2 shows with greater particularly than prior art FIG. 4B1 the wing 485B and the steps of creating an upward force on a plane, namely, lift 491. Step 1. reads "Air splits at the front;" step 2. reads "Air pressure reduced on top;" step 3. reads "Air pressure increased underneath," and step 4. reads "Air accelerated down."

FIGS. 4C1 and 4C2 are prior art figures drawn to show designs of a concentric turbine wing where the known airplane wing of prior art FIG. 4C1 has less curvature and lesser lift and drag than the airplane wing of prior art FIG. 4C2. A known airplane wing per FIG. 4C2 has flaps (not shown) which create greater wing curvature and life and drag.

FIG. 4C3 is a prior art airplane concentric wing profile intended to show definitions of terms used in describing a typical airplane wing profile view such as leading and trailing edges 474 and 471 respectively.

FIG. 4D1 shows a front view with a counter-clockwise direction of rotation with air or water flow direction into the page and FIG. 4D2 shows a side cut view section A-A respectively of one concentric wing of side cut view section A-A of one of an opposing, unidirectional turbine pair of concentric wings with one of the wings shown inside cut view FIG. 4D2. Terms from FIG. 4C3 are applied to FIGS. 4D1 and 4D2 as well as terms used in FIGS. 1A and 1B such as turbine shaft 415 and hub 450.

FIG. 5A is a similar figure to FIG. 4 showing air or water flow direction 510 referenced to X, Y and Z-axes. Prior art FIGS. 5B, 5C and 5D pictorially show the X-axis, Y-axis and Z-axis flow direction 410 respectively of FIG. 4. FIG. 5B is a prior art photograph of a wind propeller turbine, as in-line example of the X-axis as used herein for air flow. Prior art FIG. 5C is a photograph of a paddle wheel used at a site of a mill for horizontally receiving a flow of water diverted from a river or creek, the turbine shaft being in the Y-axis, horizontally orthogonal to the direction of water flow.

Lastly, prior art FIG. 5D is an example of a turbine shaft vertically crossing wind flow or the Z-axis.

FIGS. 6A and 6B are respective front and side views of multiple sets of opposing concentric blade/wing pairs (in this case, four blade pairs; N=4) mounted around a hub 650, the hub 650 (in this example, circular) surrounding a turbine shaft 615 which, when it turns, harnesses energy from wind or river flow having a direction into the page causing counter-clockwise rotation of the turbine shaft 615.

FIGS. 7A and 7B show four opposing pairs of concentric wings in front view FIG. 7A and three different planes in side view FIG. 7B, the pairs of concentric wings being mounted to hub 750 surrounding turbine shaft 715, i.e. opposing pairs of concentric wings on multiple horizontal planes (side view FIG. 7B).

FIG. 8A is a prior art photograph of a bi-directional Osprey helicopter 800 having propellers 810 mounted on a tilt-controlled motor/engine 830 and oppositely turning propeller 820 mounted on a tilt-controlled motor/engine 840.

FIGS. 8A1 through 8A6 show various flying alternatives of the prior art Osprey airplane/helicopter 800 (Bell Boeing V-22 Osprey) of prior art FIG. 8A (forward or up and down).

In summary, prior art FIG. 8A4 is a side view of the Osprey 800 in a vertical take-off mode or landing mode (moving upwards or downwards); prior art FIG. 8A5 is a front view of the Osprey of FIG. 8A4. Prior art FIG. 8A6 is a top view of the Osprey of FIG. 8A4. Prior art FIGS. 8A1 through 8A3 are side view, front view and top views respectively of an airplane mode of operation.

Prior art FIG. 8B is a cross-sectional view of an aerofoil 840 for a known airplane wing. Aerofoil 840 may be adapted to comprise a concentric wing of a bi-directional tidal concentric wing turbine.

Prior art FIG. 8C shows the phenomenon of upwash and downwash on a conventional Osprey helicopter wing. The conventional airplane wing may be adapted to comprise a bi-directional tidal turbine concentric wing.

As can be seen from prior art FIG. 8C, a complication may occur due to the effect of upwash/downwash caused by the angle of attack on an upturned Osprey helicopter wing at the upward leading edge 874 of the concentric wing (blade).

FIGS. 8D1 and 8D2 show front and top views respectively of a bi-directional wing turbine that uses an actuated rack and pinion (seen in FIG. 8D2, sections C-C and D-D) to set the left and right concentric wings 810A and 820B at a horizontal position orthogonal to the turbine shaft 815 and hub 850 where air or water flow is in-line into the page.

FIGS. 8D3 and 8D4 show front and side cut views respectively when the left concentric wing 810B1 and right concentric wing 810B2 are facing 45° toward the upper left and 45° toward the upper right respectively (in front view sections A-A and B-B). Rack and pinion movement of opposing left and right concentric wings 810B1 and 810B2 may be seen in sections C-C and D-D of FIG. 8D4.

FIGS. 8D5 and 8D6 show air or water flows from the left and right respectively of an exemplary bi-directional wing turbine that is rack and pinion opreated. FIGS. 8D5 and 8D6 show creating lift on either of wings 810B1 (different position from wing 810A) and 820B1 (different position from wing 820B).

FIGS. 9A and 9B respectively show a front view of a pair of opposing concentric wings and a right side view of FIG. 9A. Air or water flow is in either direction into or out of the page and the turbine rotates in either direction.

FIG. 9A is repeated in substantial part in the next sheet of drawings comprising FIG. 9A1. FIG. 9A1 showing expanded details of a bi-directional concentric pair of opposing wings. If air or water are flowing into the page, then, counterclockwise rotation of the opposing wings around the in-line turbine shaft 915 is shown.

FIG. 9B1 through FIG. 9E1 show right side views in FIGS. 9B1 and 9D1 of a left wing 910C in FIGS. 9B1 and 9B2 respectively, the left wing 910C in FIG. 9B1 receiving air or water flow direction from the left and in FIG. 9D1 from the right while FIGS. 9C1 and 9E1 show right side views of the right wing 910D in receiving air or water flow direction from the left in FIG. 9C1 and from the right in FIG. 9E1.

FIGS. 10A through 10G and FIGS. 10A1 through 10N1 show bi-directional concentric wing turbines with different flow directions and different views of different left and right (shown as curved triangular wings for simplicity; see wing 120C of FIG. 1B for concentric wing 120C in side view) concentric wings. In FIG. 10A, the air or water flow may be into the page and define sections A-A and B-B. FIGS. 10B-10G show sections A-A in FIG. 10C with flow direction from left to right, no flow and right to left. Section B-B of FIG. 10A is shown in FIGS. 10F-10G with flow direction from left to right, no flow and right to left. FIGS. 10A1 through 10F1 show concentric wing turbines which have been simplified to have a curved wing profile (but are concentric as first seen in FIG. 1B in side view as wing 120C) wings in front and side views with no flow (FIGS. 10A1 and 10B1), flow from left to right (FIGS. 10C1 and 10D1) and flow from right to left (FIGS. 10E1 and 10F1). FIGS. 10G1 through 10N1 show concentric wing turbines in front, top and side views with direction of flow upward and downward in-line with turbine shaft 1015.

FIG. 10A more particularly shows a front view of a bi-directional concentric wing turbine that rotates clockwise regardless of when air or water flow is into or out of the page (hence, bidirectional).

FIG. 10B shows a position of the left concentric wing section A-A where there is no air or water flow direction and the left wing 1010B is facing upward.

FIG. 10C shows the left wing of FIG. 10A receiving air/water flow from the left and the left concentric wing tilting rotationally counterclockwise and upward to a stop 1040-1 according to the angle of attack not shown and the flow is strong enough that the right side of the left concentric wing is horizontally stopped by stop 1040-1.

FIG. 10D shows the left wing of FIG. 10A receiving air/water flow from the right and the concentric wing tilting rotationally clockwise and upward according to the angle of attack (not shown) and the flow is strong enough that the right side of the left concentric wing is horizontally stopped by stop 1040-2.

FIGS. 10E through 10G show section B-B from FIG. 10A of the right concentric wing 1020B where FIG. 10E shows the right wing facing downward with no air or water flow. FIG. 10F shows air or water flow from the left and FIG. 10G shows air or water flow from the right and the wing facing downward in FIG. 10E, downward and to the left in FIG. 10F and downward and to the right in FIG. 10G.

FIGS. 10A1 through 10N1 show further views of concentric wing turbines, particularly the harnessing module component with no air or water flow or air or water flow direction from the left or right or from the bottom or top.

FIGS. 11A and 11B show two sets of counter-rotating fixed concentric wing turbines having two sets of one-way clutch bearings (OWCB's or sprags) for turning the turbine shaft 1115 in the same direction (when one of the two OWCB's is engaged) whether air/water flows from the right to left (FIG. 11B) or the left to right (FIG. 11A).

The figure descriptions above are intended to be brief descriptions of the drawings.

Following the brief description of the drawings is a more detailed description of the drawings which are not intended to be limited by the above brief description of the drawings.

DETAILED DESCRIPTION

Similar references characters will be used in the following detailed description of concentric wing embodiments where the first number of a reference numeral such as 1XX may include the Figure number where the element first appears and the XX may indicate a similar element such as a protector bar 190 seen in FIG. 1B where 1 is the figure number and ninety is the component number. Another example is a component labeled 210 for a platform is shown in FIG. 2A and FIG. 2B which is a similar platform to the platform 110 shown in FIGS. 1A and 1B.

Referring to FIGS. 1A and 1B, FIG. 1A shows a front view of an assembly of an in-line platform river turbine. FIG. 1A is a front view of a river turbine mounted on and under a platform 110 that may be tied to a river bottom or to riverbanks. FIGS. 1A and 1B each comprise assemblies of a platform 110 intended to float on a water surface via pontoons 102A and 102B and may comprise a concentric wing turbine with at least one pair of concentric wings per pair of opposing wings 120A and 120E, 120B and 120F, 120C and 120G and 120D and 120H; also see, for example, bi-directional wing turbines FIGS. 8D1 through 8D6 and 9A through 11B. Concentric wings 120C and 120G, for example, form an opposing pair of concentric wings 195 surrounding a hub 150 and a drive or turbine shaft 115 where the hub 150 may be circular, oval, square or rectangular. Its harnessing module is identified by blades 120A through 120H tied/attached to a turbine shaft 130. The harnessing module is under water and captures water flow energy from concentric wings 120A through 120H seen in FIG. 1A while a concentric wing 120C is seen in side view FIG. 1B. FIG. 1B does not properly show side views of wings 120B and 120D because these should be at 45° to concentric wing 120C. Per FIG. 1B the turbine shaft 115 may be a driving component of a chain box 188 which is vertically connected to a set of chain and sprockets 189 for driving a speed converter 145 (for example, a spur gear assembly or control module) which has three variables, one variable being an input from the harnessing module and rotating concentric wings, an output to the generator 155 and a control motor 135 for connection to the speed converter 145 being a control variable. FIG. 1B is a cut-away side view of the turbine of FIG. 1A proposing that a concentric wing 120C be used as a blade 120A through 120H. In FIGS. 1A and 1B, river turbines may be typically mounted on floating platforms 110 having a support plate 192 for hardware components except the chain box 188. As discussed herein the turbine blades may look like airplane wings but are structured and designed for use as harnessing module concentric wings. The river turbine may be bi-directional, but water flow is shown flowing left to right in FIG. 1B "in-line" with turbine shaft 115, where "in-line" in this case means in the same plane and in the same direction as the left to right water flow. It is an object of the present invention to study airplane wings such as concentric wings for the purpose of harnessing greater energy amounts than is known from using paddles, buckets, blades or propeller blades known in the art.

In FIGS. 2A and 2B there is shown a Prior art example of a bi-directional water energy harnessing module mounted under floating platform 210 where turbine shaft 215 crosses a flow of water from right to left (FIG. 2A side view) or from right to left (FIG. 2B). A hatch 220 may be attached to/surrounded by a paddle or vane 240 so that the hatch 220 may move to the position shown in FIG. 2A with water flow from the right to left through one side of the harnessing module because of the water flow controlling the location of the paddle or vane 240. The hatch 220 may move (swing around the waterwheel 230 with a change in water flow direction from right to left to left to right, FIG. 2A to FIG. 2B) to the opposite side to the position shown in FIG. 2B when the water flow is from left to right when the paddle of vane 240 catches the water flow from left to right.

Referring to Prior art FIG. 3A and FIG. 3B, there is shown a front view and a side view respectively of a tidal turbine with bidirectional water flow that is hinged trap door controlled. The waterwheel 340 may have protector bars 310, 320 for protecting the waterwheel from floating debris (and also stopping debris from flowing between the protector bars 310/320). The protector bars 310 can also prevent water flow from reaching the waterwheel channeling the water away from the top or bottom half of the waterwheel 340. Moveable, hinged trap doors 330 on the other hand operate with different directions of water flow to permit water to be released by the waterwheel 340 when the direction of water flow if from right to left as shown in FIG. 3B (or from left to wight, not shown). If water flow were from left to right, the top left hinged moveable trap door 330 would allow water flow to the top of the waterwheel 340 while the bottom left protector bar 310 and bottom right hinged trap door 330 would allow water to reach the bottom half of the waterwheel 340. As with FIGS. 2A and 2B, this prior art tidal turbine shows bi-directional water flow which crosses the direction of turbine shaft 315 and so is not in-line with the water flow. Thus, the waterwheel 340 of FIGS. 3A and 3B may also be used for bi-directional water flow by action of the hinged moveable trap doors 330. The hub 350 and turbine shaft 315 cross the direction of water flow in the horizontal plane and are shown in FIG. 3B. Waterwheel 340 rotation can be bi-directional and be controlled, for example, with the protector bars 310/320 stationary and the moveable hinged trap doors 330 moved on an open or closed position depending on the direction of water flow—right to left water flow being shown in FIG. 3B with hinged moveable trap doors 330. Referring now to side view FIG. 3B, there is shown a side view with water flowing from right to left. Note that the water flow closes the bottom right trap door 330 (at the right bottom) and opens the top left trap door 330 (at the left top) when water flows from right to left. So, the top half of the waterwheel 340 is used in FIG. 3B with water flowing from right to left through the protector bars 310, 320 and the bottom half of the waterwheel 340 is not used. If water flowed in the opposite left to right direction, the right bottom hinged trap door 330 (at the bottom right) would be opened and the waterwheel 340 would turn in the same counter-clockwise direction. It is an objective of the present invention that no hatches or moveable trap doors be needed if a pair of concentric wings are used in a bi-directional tidal or ocean wave turbine.

FIG. 4 shows a convention for X, Y and Z-axes relative to air or water flow direction, for example, from left to right (or up and down as in wave motion). The X-axis is in-line with water flow or air flow (wind) direction 410. In FIGS. 1A and 1B, the turbine shaft 115 is in-line on this X axis with water flow. Another way of saying in-line is that the X-axis of a waterwheel shaft in-line with the X-axis would capture the energy flow of water from left to right 410 (or the reverse direction, not shown) would cause a waterwheel to turn if mounted on the Y-axis (not in-line, rather the waterwheel turbine shaft would cross the X axis water flow direction 410. The Y-axis horizontally crosses the X-axis flow of wind or water 410. A waterwheel turbine shaft may be in the Y-axis as seen in the prior art FIGS. 2A-3B. A vertical axis wing turbine shaft may be in the Z-axis (see Prior art FIG. 5D). The Z axis, for example, indicates a vertical direction, for example of a turbine shaft, to transmit the harnessed energy received horizontally from all directions in prior art FIG. 5D. The Z-axis is vertically in-line with up and down ocean wave movement and may be used with concentric shaped wings as will be suggested herein. A first embodiment of a concentric wing turbine (CWT) invention (FIGS. 1A and 1B) is for harnessing uni-directional river energy in-line with the flow direction and may receive air or water flow in either of two directions along the X-axis. Since the river energy is powerful and the flow of a river is typically in one direction, harnessing modules of uni-directional river turbines have to be strong, produce greater torque and may harness and develop high torque and high energy because water has much greater mass or density than air.

FIG. 4A is a sketch of a modified helicopter 400 having a pair of rotating in-line opposing concentric wings 410A and 410B which are opposite one another. There is a wing support shaft 460 for each concentric wing 410A and 410B, that passes through the concentric wings at its center and can rotate the wing slightly to increase or decrease its angle of attack 830 (see FIG. 8B, angle α). A motor/engine, not shown, applies torque to rotate the hub and rotor shaft 415 in one direction (clockwise) to rotate the propeller blades (concentric wings) 410A and 410B resulting in lift. It is hypothesized that the wings be concentric meaning that the leading edge of each concentric wing is concentric with the opposing wing support shafts 460 leaving each side of the hub and rotor (turbine) shaft 415. The rotating concentric wings 410A and 410B apply lift to lift the helicopter 400 to lift the helicopter off the ground and for landing. If the helicopter is tilted forward and the tail lifted slightly, the helicopter 400 may move forward. It is also hypothesized that rotating helicopter wings of the concentric wing type may be similar to the opposing wings of a turbine of in-line concentric wings per FIGS. 1A and 1B. The un-labeled rotor propeller at the end of the helicopter is for stability and can control direction of helicopter 400 forward, backwards and turning direction motion.

FIGS. 4B1 and 4B2 are Prior art figures which discuss the similarly facing symmetric wings of known propeller driven airplane 480 where there may be an opposing pair of concentric wings 485, 485A, 485B and 485C (only one wing shown) mounted approximately as shown in side view of FIG. 4B1 for forward and upwards movement by propeller action; (airplane wings are symmetrical relative to the body and create upward/downward lift 491). Concentric wings of embodiments of the present invention may use a wing support shaft (not shown), but see, for example, FIGS. 8D1-8D2), to hold the two wings in opposition and to create rotational lift in a helicopter but not in an airplane which have wing flaps (not shown) to change the angle of attack. FIG. 4B1 shows a wing 485B under influence of an upward force (lift 491) and a downward force (drag 492) in a downward direction 485A, but a flap typically used in airplane wings is not shown for causing the downward direction of forward movement. When flaps (not shown) are turned downward or the wing is turned downward (so the flaps (not shown) point downwards), the plane 480 will begin to lose altitude. Drag is a force caused by, for example, flaps which slow a plane down or may cause the plane to move upward or downward. With wing 485B, the key to upward or downward movement is the angle of attack on wing 485B at the leading edge of the wing which is somewhat circular or concentric (as will be discussed further herein) which causes the force of Lift 491 to lift the plane 480 as it is propelled forward. In an exaggerated angle of attack as per wing 485C, the lift force 491 is even greater than with wing 485B until the airplane reaches a position of "stalling" (a phenomenon where a pilot can lose control of their airplane and the airplane crash).

FIG. 4B2 (Prior art) shows with greater particularity the wing 485B and the steps of creating an upward force on a plane, namely, lift 491. In step 1., the air splits at the front of the wing (the concentric wing leading edge). As the air passes over the wing, air pressure reduces at the top surface of the wing 485 (step 2.). The air follows the curvature of the top surface of the wing. On the other hand, at step 3., the air pressure is increased underneath the wing as a reaction to the proper angle of attack for lift. At the trailing edge and step 4., wind having passed over the upper and lower surfaces of the wing accelerates downward creating a downward force on the air leaving the trailing edge of wing 485B which is translated to a lift of wing 485B. Generally, the wing 485B lifts the plane because the amount of lift lifts the plane to a higher altitude (without the plane stalling). These principles may be applied to concentric turbine wings as will be described herein.

FIGS. 4C1 and 4C2 (Prior art) are drawn to show a prior art airplane wing having a design of a concentric turbine wing where the wing of FIG. 4C1 has less curvature (lesser lift and drag) than the greater curvature of the wing 485B of FIG. 4C2 (greater lift and drag) because the flaps of the concentric wing have been lowered to increase the angle of attack. (There is an accentuated flap, unnumbered, in FIG. 4C2 at the trialing wing edge). The wing 485B of FIG. 4C2 is a concentric wing with longer and a more curved trailing edge to obtain greater lift and drag than the flatter wing of FIG. 4C1. Greater lift and drag may be desirable as in-line opposite/concentric wings of a waterwheel or wing propeller. Whether water flow or wind flow, the same principle of obtaining lift applies.

FIG. 4C3 (Prior art) is intended to show definitions of terms used in describing a typical concentric airplane wing 485 in profile view which terms may also be used to describe a concentric wing turbine. The trailing edge 471 may typically be a sharp edge and is opposite a curved leading edge 474 which is curved to a degree according to its radius of curvature given by leading edge radius 476. A location of maximum wing thickness 477 from the leasing edge 474 is measured from the leading edge 474 to a location of maximum thickness 478. Maximum camber location 475 (camber is arching at top and bottom wing surfaces) is related to the lengthwise curvature at upper and lower surfaces and is shown as maximum camber 461. A mean camber line 472 is denoted by the camber location along the curved wing width according to the arching or curving of top and bottom wing surfaces 465 and 466, respectively. A chord line 462 runs horizontally straight from the leading edge 474 to the trailing edge 471. When straightened, this chord line is simply called a distance cord 473 having a measurable distance. Upper wing surface 465 is shown for the wing 485 directly above lower wing surface 466.

FIGS. 4D1 and 4D2 show a front view and a side cut view section A-A respectively of an opposing, unidirectional pair of concentric wings of turbines for air or water with one of the wings shown in side cut view FIG. 4D2 forming side cut view section A-A. Terms from FIG. 4C3 are applied to FIGS. 4D1 and 4D2 as follows. In-line turbine shaft 415 is typically round while hub 450 may be round, oval, square or rectangular (round shown) as will be seen in subsequent drawings. Wing support shafts (unnumbered and not shown) support the concentric wings at their centers. Leading edge 474 and fixed flap 464 of the right wing are seen in section A-A from FIG. 4D1 as leasing edge 474 through fixed flap 464 of FIG. 4D2. An un-numbered opposing wing to the concentric wing with leading edge 474 with fixed flap 464 is shown at the left of FIG. 4D1. A concentric wing turbine may have a curved upper surface 465 and a comparatively straight lower surface 466 but for a fixed flap 464 for creating a drag force per FIG. 4D2. Because of fixed flap 464 pointing down in FIG. 4D2, there is greater lift and drag. A chord line 462 is shown running through the wing of a concentric wing side cut view Section A-A in FIG. 4D2. In this example, water (or air) flows over a leasing edge 474 in-line with turbine shaft 415 with water flowing into the page and causes a counterclockwise direction of rotation of the opposing concentric wings in front view FIG. 4D1. The water or wind flow in FIG. 4D2 is into the page of FIG. 4D1 applying torque over the leading edge 474 to cause the wings to turn in a counterclockwise direction of rotation. "N" is defined as the number of pairs of concentric wings of a wind or river turbine. In this case, the turbine water flow is in one direction and N equal one pair of wings.

FIG. 5A, FIG. 5B, FIG. 5C and FIG. 5D pictorially show the X-axis, Y-axis and Z-axis-510 of FIG. 4 in FIG. 5A. FIG. 5A is similar to FIG. 4 showing an in-line direction of air or water flow 510. FIG. 5B is a Prior art photograph of an example of the X-axis as used herein. A wing propeller shaft is shown receiving air flow in-line with the X-axis and a turbine shaft (seen facing the wing flow in the horizontal X-axis) and with the propeller oriented so that the depicted propeller feels the full flow of wing on its three propeller blades. FIG. 5C is a Prior art photograph of a paddle wheel used at a site of a mill for horizontally receiving a flow of water diverted from a river or creek and comprises a shaft oriented according to the Y-axis or a horizontal crossing of the unseen waterwheel shaft of the waterwheel. As the water flows under the paddle wheel, the paddle wheel will turn as the water is captured by each vertical side of each paddle of perhaps one hundred paddles of the paddle wheel as the wheel turns. This water flow is an example of horizontally crossing water flow or Y-axis water flow. FIG. 5D is a Prior art photograph of an example of vertically crossing wind flow or the Z-axis. FIG. 5D comprises six cupped, round surfaces vertically facing in all directions that the wind may horizontally flow. Any wind flow in any horizontal direction causes the six vertically mounted surfaces to turn a vertically crossing shaft (Z-axis) of the horizontal flow of wind no matter what direction the wind is flowing from.

FIGS. 6A and 6B are respective front and side views of multiple opposing pairs of blade/wing pairs (in this case, four opposing wing pairs; N=4) mounted around a hub 650, the hub 650 (in this example, circular) surrounding a turbine shaft 615 which, when it turns, harnesses energy from wind or river flow into or out of the page and in-line with the turbine shaft 615. The wing support shafts are not specifically shown and are not numbered in this drawing, but the shorter, lighter shaded hatching identifies the leading edges of each wing. Also, the line separating the leading and trialing edges of the four opposing pairs of concentric wings may be at the center of mass of the wing and so locate a position of a wing support shaft. All blade/wings of front view FIG. 6A (flow into or out of the page) are in the same horizontal plane (X-axis) as the turbine shaft 615 and, as seen in FIG. 6B, the side view, orthogonal to and the wings are in-line with left to right or right to left flow direction and in the direction of the turbine shaft 615 (X-axis) and located at an undisclosed angle of attack. Seen in side view FIG. 6B, the central pair of opposing concentric blade/wings surrounds turbine shaft 615 and N=1. N=2 is at 45°: is intended to show opposing wing pairs at +45° and −45° and when N=3, the opposing blades/wings pair are orthogonal or at + or −90° as in FIG. 6A front view + or −90°. When N=4, the blades are at 135° and −45° showing the sharp, darker shaded trailing edge. By "multiple sets (opposing pairs) of concentric wings on a plane" is intended in a vertical plane in side view FIG. 6B (for receiving air or water from right or left in-line with turbine shaft 615) or in the same plane and direction of air or wind flow. In the next FIGS. 7A and 7B, there may be multiple parallel planes of sets (opposing pairs) of pairs of concentric wings.

FIGS. 7A and 7B show four opposing pairs of concentric wings in N=3 different parallel planes surrounding turbine shaft 715, i.e. opposing blades or wings on multiple parallel planes in side view where opposing wing pairs at + or −45° are when N=2. Hub 750 is elongated and comprises three hubs 750 (cylinders) in FIG. 7B such that each opposing wing pair turns around turbine shaft 715 and the hubs 750 in FIG. 7B may be other than circular, a circular hub 750 is shown in front view FIG. 7A. When N equals 2, the opposing pairs of concentric wings may be in the same plane and are at + or −45°.

FIG. 8A is a Prior art photograph of a bi-directional Osprey helicopter 800 having three propeller blades 810 mounted on a tilt-controlled motor/engine 830 and three oppositely turning propeller blades 820 mounted on a tilt-controlled motor/engine 840. There is a typical concentric airplane wing seen (unnumbered) connecting the two engine-driven propellers 810, 820 and motors 830, 840 for forward motion and lift (not numbered). The airplane/helicopter 800 may go vertically up and down and forwards depending on engine speed and propeller tilt and direction. The concentric wing is located above the plane which carries both propeller engines 830, 840 which rotate per FIGS. 8A1-8A6.

FIGS. 8A1 through 8A6 (Prior art) show various flying alternatives of the Osprey airplane/helicopter 800 (Bell Boeing V-22 Osprey) of FIG. 8A. In side view of FIG. 8A1, front view FIG. 8A2 and top view FIG. 8A3, it is seen that the propellers are facing forward for flying as a propeller-driven airplane flies forward, and so the airplane/helicopter flies in a similar manner to a propeller-driven airplane in FIG. 8A1-8A3 and takes off and lands like a helicopter per FIGS. 8A4, 8A5 and 8A6 (side view, front view and top view respectively). FIGS. 8A2 (flying forward) and 8A5 (landing or taking off) are front views. The Osprey of FIG. 8A2 with its large propellers moves the Osprey forward out of the page toward the viewer. FIGS. 8A4, 8A5 show lift-off or landing as a helicopter. FIGS. 8A3 and 8A6 are top views of the Osprey flying from left to right in FIG. 8A3 or landing or taking off in FIG. 8A6.

In summary, FIG. 8A4 is a side view of the Osprey 800 in a vertical take-off mode or landing mode (moving upwards or downwards in a helicopter mode); FIG. 8A5 is a front view of the Osprey of FIG. 8A4 in a helicopter mode. FIG. 8A6 is a top view of the Osprey of FIG. 8A4 or 8A5 in a helicopter mode. FIGS. 8A1 through 8A3 are side view, front view and top views, respectively, of an airplane mode of operation. FIGS. 8A4 trough 8A6 are views of a helicopter mode of operation. Concentric wings for flying as an airplane are seen best in perspective view FIG. 8A3 (and 8A6 in a helicopter mode).

FIG. 8B is a Prior art cross-sectional view of an aerofoil 840 of an airplane wing adapted for use in a bi-directional tidal wing turbine as one wing of an opposing pair of concentric wings of a bi-directional tidal turbine where the angle of attack α 830 on the depicted wing is the angle between the free air stream and the aerofoil 840 having a chord 873. A resultant force 893 between lift 891 and drag 892 for aerofoil 840 given angle α of attack 830 shows that the lift 891 is less than the drag 892 but the resultant force 893 is a positive force upward (and dragging because of the downward trailing edge 871) causing the aerofoil concentric wing to turn upon impact with the water (or air) hitting the leading edge 874. Angle of attack 830 may vary with a position of a wing support shaft (not shown). In the case of a concentric wing pair rotatable about a turbine shaft and receiving an air stream at its concentric wing sides, the resultant will turn the concentric wing in the direction of air flow; (picture a fan blade freely turning due to air hitting the fan blades when the fan motor is turned off). Aerofoil 840 may have application in a bi-directional tidal turbine comprising opposing aerofoils surrounding a hub. For example, if there is a wind blowing on a fan that has had its motor turned off, the fan blades will turn when the wind hits the leading edges of the fan blades.

FIG. 8C (Prior art for airplanes) shows the phenomenon of upwash and downwash on a bi-directional tidal turbine concentric wing. From FIG. 8B, we note that the forces acting on a typical aerofoil 840 section of an axial flow fan blade are lift 891 caused by the free air stream hitting the blade at an angle of attack α 830 and drag 492 with a resultant force 493 shown in FIG. 8B. Upwash of air or wind hits the leading edge 874 and hugs the wing's surface until downwash occurs at the trailing edge 871 and has a similar impact on a bi-directional tidal turbine.

As can be seen from FIG. 8C, a complication may occur due to the effect of upwash/downwash caused by the angle of attack on an upturned wing at the upward leading edge 874 of the concentric wing (blade). The air/water flowing over the concentric wing upper surface tends to hug the upper wing surface rather than proceeding upward. Thus, the upwash tends to create a negative lift and thus it needs to be compensated by pushing more air down at the lower leading edge 874. Also evident from FIG. 8C is the fact that the top wing surface does much more to move the air than the bottom surface. Hence, the top surface of the wing is the more critical surface. Downwash (air following the top surface of the wing) at the trailing edge 871 can be accentuated by downward flaps that create drag and cause, for example, top and bottom surface air flow to wash downward.

FIGS. 8D1 and 8D2 show front and top views respectively of a bi-directional concentric wing turbine that uses an actuated rack 865 (rack gear) and pinion 870 (circular gear meshing with the rack 865) (both rack 865 and pinion 870 seen in FIG. 8D2) to set the left and right concentric wings 810A and 820B at an in-line or horizontal position orthogonal to and flow direction is in-line turbine shaft 815 and hub 850. (In FIG. 8D1, air or water flow is in or out of the page in-line with turbine shaft 815. Also, all left and right concentric wings of FIGS. 8D1 through 8D6, FIGS. 9A and 9B, and FIGS. 9A1 through 9E1 are shown as simplified wings similar to those shown as concentric wing 120C of FIG. 1B and the concentric wing of FIGS. 4D1 and 4D2 and derivatives thereof.) Wing support shafts 860 are shown in both FIGS. 8D1 and 8D2 which may be turned from a horizontal position shown via the rack 865 and pinion 870. Notice that the circular gear or pinion 870 is in the middle of the rack gear 865 for placing the left and right wing 810A, 810B in a horizontal position (FIG. 8D1) via the wing support shaft 860. The pinion 870 may be moved on rack 865 by a motor not shown. The angle of attack of the wings is 0°. Section A-A shows the left concentric wing 810A and section B-B shows the right concentric wing 820B. In this figure, the left wing and the right wing are not distinguishable from one another having similar leading and trialing edges. Per FIG. 8D2, the top view, section C-C shows that the rack and pinion for the left wing or right wing are centered (stationery at center). Also, as per FIG. 8D2, the top view, section D-D shows that the right rack 865 and pinion 870 for the right wing are centered (stationary at center) as is the left rack 865 and pinion 870 for the left wing.

FIGS. 8D3 and 8D4 show front and side cut views respectively when the left concentric wing 810A and right concentric wing 820B are facing 45° toward the upper left and 45° toward the upper right respectively (in sectional A-A and B-B views). Referring to FIG. 8D4, the pinion 870 has been rotated clockwise downward in sectional view C-C. For the left wing 810B1 to have an angle of attack of 45° the pinion 870 has moved clockwise down the rack 865. On the other hand, the right wing 810B2 has an angle of attack of −45° and the pinion 870 has been moved counterclockwise down the rack 865 in sectional view D-D. It may be clearly seen that the left and right wings of an opposing pair of concentric wings may be rack 865 and pinion 870 operated. When the rack and pinion rotate clockwise to a down position (section C-C) and the right rack gear is rotated counterclockwise to the down position (section D-D), the wing turbine may be bi-directional without the need for a hatch and paddle or a vane or trap doors as per FIGS. 2A, 2B, 3A and 3B when water or air flow is in either direction of flow. In particular, FIGS. 8D5 and 8D6 show wind change from left to right and from right to left respectively with reference to sectional views of wings 810B and 820B. Each wing support shaft 860 turns each wing so that flow from either direction can cause lift or torque on the turbine shaft 815.

FIGS. 8D5 and 8D6 show air or water flows from the left creating lift and air or water flow from the right creating lift on wings 810B1 and 820B1 (same or different wings). The wings 810B1 and 820B1 are rack and pinion actuated to be either pointing 45° toward the upper left to create lift when air/water flow is from the left or 45° toward the upper right to create lift when air/water flow is from the right. Wings 810B1 and 820B1 may be mounted opposite one another and connected to a hub and shaft (not shown) for receiving water flow from the left or the right and together turn in the same direction of rotation regardless of air/water flow direction.

FIGS. 9A and 9B show front views and right side views respectively of bi-directional concentric wings for an air or water flow turbine. FIGS. 9A and 9B show another position (wings straight up and down) of bi-directional concentric wings of a turbine, namely, the rack and pinion gears have moved the left wing 910C to be pointing up while the right wing 910D is pointing down. The turbine is rotating around the turbine shaft 915 in-line with air or water flow. Wing support shaft 960 defines the curved leading edge of a concentric wing from the trailing edge. Note that per FIG. 9B, the left wing 910C is pointing up perpendicular to the in-line turbine shaft 915 while the right wing 910D is pointing down as actuated by the rack and pinion gears (not shown). The right wing 910D is coming out of the page from the hub opposite wing 910C which extends into the page. (The hub is pictured as square or rectangular in FIG. 9A).

FIG. 9A is repeated in the next sheet of drawings, FIG. 9A1. The difference between FIGS. 9A and 9A1 is that FIG. 9A1 assumes air is moving in-line out of the page to cause counter-clockwise rotation while wings in FIG. 9A are bidirectional. FIGS. 9B1 through 9E1 show flow direction from left (FIGS. 9B1 and 9D1) for left wing 910C and right wing 920D. FIGS. 9D1 and 9E1 show flow direction from right to left for left wing 910C and right wing 920D and flow direction from right to left for FIGS. 9D1 and 9E1. FIG. 9A1 clearly shows counterclockwise (CCW) rotation of the turbine shaft 915 when direction of flow hits the leading edge per FIGS. 9B1 and 9C1. FIGS. 9B1 through 9E1 are added to show different angles of attack, directions of air/water flow and directions of left and right opposite wings of lift force. As already shown, FIG. 9A shows a front FIG. 9A shows a front view of a bidirectional concentric wing turbine harnessing module with a counterclockwise rotation about turbine shaft 915 and hub 950. FIG. 9A shows left wing 910B pointing up and right wing 920B pointing down. Now, assuming that air/water flows from left to right (flow direction arrow), FIGS. C1 and 9E1 shows a right-side view of right wing 920D where the angle of attack 930C is positive and wing 920D is moved clockwise from pointing down to pointing to the side to a stop 940 while the direction of air/water flow is from left to right. The lift force 944 is upward. Stop is indicated as 940 for the given angle of attack (perhaps about 50°. (FIG. 9D1 is a right-side view of the left wing 910C but the direction of air/water flow is from left to right as with FIG. 9E1. FIGS. 9D1 and 9F1 are discussed later with the opposite flow direction). FIG. 9B1 is a view of the direction of air flow from left to right with the angle of attack 930A pointed at a left wing 910C moving clockwise from vertical to an upward lift position at stop 940 so that the resulting lift 942 is downward. Stop position 940 is shown for the given angle of attack 930A. Wing support shaft 960 is also shown about which left wing 910C rotates. Now referring to FIG. 9D1 and FIG. 9E1, the respective angles of attack and direction of air/water flow is from right to left. In FIG. 9D1, the concentric wing 910C moves from a vertical position counterclockwise to a position for downward or a negative lift force 942 at stop 940. The right-side view of the left wing 910C shows downward lift 942 with the air/water flow from right to left at angle of attack 930B. Lastly, FIG. 9E1 shows a right side view of right wing 920D. Right wing 920D is moved clockwise from a vertical down position to a position having an angle of attack 930D at stop 940. The resultant lift force upward 944 is positive or upwards. Stop position 940 is shown at the top left surface of wing 920D which rotates about wing support shaft 960.

Now, a curved concentric wing as a simplification of, for example, concentric wing 120C of FIG. 1B is introduced in a brief description of FIGS. 10A-10G where FIG. 10A is its own sheet. FIG. 10A shows sections A-A of a left wing 1010B and a wing support shaft 1060 connected to turbine shaft 1015 and shows section B-B for the right wing 1020B. The opposing wing pair of left wing 1010B and right wing 1020B rotates about the turbine shaft 1015 clockwise. FIGS. 10B through 10G show concentric wings at no flow (FIGS. 10B and 10E), flow from left to right (FIGS. 10C and 10F) and flow from right to left (FIGS. 10D and 10G). FIGS. 10B1 through 10F1 show side views with no flow (FIGS. 10A1 and 10B1), flow from left to right (FIGS. 10C1 and 10D1 concentric wings at no flow (FIGS. 10A1 and 10B1), flow from left to right (FIGS. 10C1 and 10D1) and flow from right to left (FIGS. 10E1 and 10F1) with reference to turbine shaft 1015. FIGS. 10A1, 10C1 and 10E1; FIGS. 10G1-10N1 and FIGS. 11A-11B (sprag or one-way clutch bearing (OWCB) engagement depending on flow direction). FIGS. 11A and 11B show flow directions from left and right respectively. FIG. 11A shows engagement of left one-way clutch bearing so the left turbine wing rotates clockwise and the right turbine wing rotates counterclockwise. When flow is from right to left as in FIG. 11B, the right sprag (OWCB) engages, the right turbine wing rotates clockwise and the left turbine wing rotates counterclockwise. The turbine shaft 1115 continues to rotate clockwise in both FIGS. 11A and 11B. A "developed profile" as used herein for the concentric wing shapes shown in FIGS. 10A through 10G, FIGS. 10A1 through 10N1 and FIGS. 11A through 11B means that the developed profile is not a certain known concentric profile having a curved leading edge, but a profile that was experimentally developed for use with a turbine according to the invention of these Figures that may be shaped more like, for example, concentric wing 120C of FIG. 1B or concentric wing 410A or 410B of FIG. 4A or the concentric wings of FIGS. 4D1 and 4D2 in front and side view. A curved leading edge is preferred and curved wing (leading edges of the concentric wings) are preferred. Further experiments with different profile wings may result in the development of different shapes of profiles beside a concentric wing profile with a concentric, curved leading edge. Flow direction motion is either from one side or the other per FIGS. 11A and 11B. Sprags (one-way clutch bearings) (OWCB)) are shown in these figures to cause proper engagement of the concentric curved leading edge turbine wings shown, for example, in FIGS. 1B and 4D1 to 4D2 depending on air/water flow direction. (an electromechanical system may also be used in place of one-way clutch bearings).

Referring again to FIG. 10A, FIG. 10A shows a front view of a left concentric (developed curved profile) wing 1010B and right concentric wing 1020B mounted opposite one another around a turbine shaft 1015 and hub 1050 and supported by a wing support shaft 1060 for each wing, for example, at its center of mass. Wind or water flow is into the page causing clockwise turbine shaft 1015 rotation. Clockwise rotation with sections A-A and B-B is shown for left wing 1010B and right wing 1020B. In FIGS. 10B, 10C and 10D with different air/water flow directions (no flow, flow from left and flow from right respectively) are shown all with reference to Section A-A. The left wing 1010B, sectional view A-A is not moved with no flow; moved to the left in FIG. 10C with flow from the left to stop position 1040-1 and moved to the right with flow from the right to stop 1040-2 for example by rack and pinion (not shown).

In FIGS. 10E (Section B-B of right wing 1020B, no flow), 10F and 10G with different air/water flow directions (no flow, flow from left and flow from right respectively), the right wing 1020B is shown facing down at section B-B. The right wing 1020B is not moved in FIG. 10E with no flow and no movement about wing support shaft 1060; wing 1020B (section B-B) is moved to the right in FIG. 10F to stop 1040-3 with flow from the left to the right around wing support shaft 1060 and moved to the left in FIG. 10G with flow from the right to stop 1040-4 about wing support shaft 1060.

FIGS. 10A1 through 10F1 show front and side views of opposing pairs of concentric wing turbine harnessing module wing components with either no flow, flow from left to right or flow from right to left. The horizontal turbine shaft 1015 is not receiving any flow in FIG. 10A1 and FIG. 10B1, front and side view respectively. The concentric wing profiles are in an at rest or no flow position. Similarly, in side view FIG. 10B1, one sees the slim height of each wing and not its full extension. On the other hand, in FIG. 10C1, front view, with flow direction from the left, one sees movement of the simplified concentric wing profiles so that in FIG. 10D1, the wide horizontal line shaded wing is shown to the left and the darker tight horizontal line shaded wing is to the right in side view when flow is from left to right. Left to right flow direction causes wings 1060A and 1060B to tilt to the left. In FIGS. 10E1 and 10F1, the wide vertical line shading and narrow vertical line shading of the wings are vertical. The flow is from the right to the left per front and side views FIG. 10E1 and FIG. 10F1. In side view FIG. 10F1 side view, the wide vertical line shaded concentric wing is seen to the left and the narrow, vertically lined wing is seen to the right. Flow direction from right to left causes wings 1060A and 1060B to tilt to the right.

FIGS. 10A1 through 10F1 further include FIGS. 10C1 and 10D1 which show front view with flow direction from left to right and side view respectively. A front view with flow direction from right to left is shown in FIG. 10E1 and the side view in FIG. 10F1. FIGS. 10A1 and 10B1 show front and side views of simplified concentric wings with on flow direction and the wings are at rest and there is no flow.

FIGS. 10G1 through 10N1 are intended to introduce further groups of direction of flow up (in-line with turbine shaft 1015) in FIG. 10G1, top view, left wing up, right wing down; FIG. 10H1, side view, concentric wings tilted toward the flow direction; FIG. 10K1, front view with direction of flow FIG. 10M1 showing a flow upward and per FIG. 10K1, Front view, a rotation of the wings clockwise. FIGS. 10I1 through FIG. 10N1 show clockwise rotation of the turbine shaft 1015 even when the flow direction is down per FIG. 10N1.

FIGS. 10G1 through 10N1 also show concentric wing turbines with simplified concentric wings with the emphasis being that with a flow direction pointing down in FIG. 10N1, the same clockwise rotation seen in FIG. 10L1 results as in FIG. 10K1 where flow direction is up. FIG. 10G1 shows a top view with the left wing up and right wing down while FIG. 10I1 shows a top view also with left wing up and the right wing down. The flow or air or water is up in FIGS. 10M1, 10K1, 10G1 and 10H1 and the flow direction is down in FIGS. 10N1, 10I1, 10J1 and 10L1. Clockwise rotation of the turbine shaft 1015 as seen in FIGS. 10K1 and 10L1 results regardless of the direction of flow.

FIGS. 11A and 11B show two sets of counter-rotating fixed simplified concentric wing turbines having one-way clutch bearings (OWCB's or Sprags) for turning the turbine shaft 1115 in the same direction (clockwise) whether air/water flows from the left to right (FIG. 11A) or from the right to the left (FIG. 11B). In FIG. 11A, the left turbine shaft 1115 rotates clockwise because the left Sprag or one-way clutch bearing (OWCB) between the turbine shaft 1115 and the left turbine wing is engaged. The right turbine wing rotates counterclockwise because the OWCB is unengaged. As a result, the turbine shaft 1115 continues to rotate clockwise in FIG. 11B. Again, the emphasis is that the same clockwise rotation of the turbine shaft 1115 results in both FIGS. 11A and 11B when the flow is from right to left or from left to right respectively. In FIG. 11B, the left turbine wing rotates counterclockwise and the right turbine wing rotates clockwise when the right sprag or one-way clutch bearing (OWCB) is engaged and the left OWCB is unengaged. Again, the left turbine wing rotates counterclockwise and the right turbine wing rotates clockwise but the turbine shaft rotate in the same clockwise direction as in FIG. 11A.

Thus, there has been shown and described an improved concept for a harnessing module for a wind or water turbine that comprises pairs of concentric wings which may be concentric (similar to airplane wings) or which may in alternative embodiments be similar to wing 120C of FIG. 1B or concentric wings of FIGS. 4D1 and 4D2 or equivalent embodiments thereof. Opposing concentric pairs are lifted or rotates when water or wind flows in-line with a turbine shaft and activates the wing to lift or rotate the opposing wing pairs at an angle of attach greater than 0° and, for example, less than 50°.

The invention claimed is:

1. A harnessing module for harnessing renewable wind and water energy comprising at least one pair of opposing concentric wings for rotation on first and second wing support shafts mounted orthogonally to a turbine shaft having at least one hub surrounding the turbine shaft, the harnessing module comprising:

the at least one pair of opposing concentric wings, each opposing concentric wing supported by one of the first and second wing support shafts for use in generating renewable electrical energy, each opposing concentric wing of the at least one pair of opposing concentric wings having a circular side having a leading edge for facing one of air and water flow direction, the first and second wing support shafts of the at least one pair of opposing concentric wings capable of rotating one of the at least one pair of opposing concentric wings to an angle of attack, each opposing concentric wing of the at least one pair of opposing concentric wings having one of a curved downward top surface and a curved upward bottom surface and a curved upward top surface and a curved downward bottom surface, where flow direction of air or water is in a horizontal plane in one direction facing the turbine shaft in the same horizontal plane defining an in-line flow direction of one of air and water in-line with the turbine shaft;

the turbine shaft for supporting the first and second wing support shafts for the at least one pair of opposing concentric wings, the turbine shaft for rotating responsive to the at least one pair of opposing concentric wings receiving air or water flow direction at the leading edge of each concentric wing, each curved side of each concentric wing having one of the first and second wing support shafts passing through each concentric wing of the at least one pair of opposing concentric wings, the one of the first and second wing support shafts being at a center of mass of each concentric wing and each concentric wing having no flap at a trailing edge of the concentric wing to increase a curvature of each concentric wing;

the circular side and a flat, curved upper surface of each concentric wing being at a positive angle of attack with air or water flow where one of water or wind flow is received at the leading edge of each concentric wing and provides lifting rotation of the at least one pair of opposing concentric wings; and the at least one pair of opposing concentric wings rotating about the turbine shaft for generating electricity from either wind or water flow.

2. The harnessing module of claim 1 comprising a number of pairs of opposing concentric wings where the number of pairs of opposing concentric wings is greater than or equal to two pairs of opposing concentric wings;

the greater than or equal to two pairs of opposing concentric wings mounted to the same turbine shaft and via the at least one hub, each pair of opposing concentric wings supported by one of the first and second wing support shafts and spaced equally about the at least one hub, and the pairs of opposing concentric wings each having the one of the first and second wing support shafts for rotating each concentric wing of a concentric wing pair by rotating a rack gear and a meshed pinion gear located in the at least one hub.

3. The harnessing module of claim 1, the pairs of opposing concentric wings mounted on first and second different hubs to the same turbine shaft for separate rotation and driving of the turbine shaft in the same direction of rotation, the first and second different hubs mounted next to one another along the turbine shaft and attached to the turbine shaft, the turbine shaft being in-line with a direction of flow of one of air and water.

4. The harnessing module of claim 1 comprising four pairs of opposing concentric wings mounted orthogonally to the turbine shaft, each concentric wing of the four pairs of opposing concentric wings spaced at 45° from one another and having leading edges facing in the same direction for receiving air or wind flow from that same direction.

5. The harnessing module of claim 1 comprising the at least one pair of opposing concentric wings mounted to the turbine shaft having first and second one-way clutch bearings, the first and second one-way clutch bearings connected to first and second opposing concentric wings, the first one-way clutch bearing for engaging the in-line turbine shaft and the second one-way clutch bearing for not engaging the in-line turbine shaft, the turbine shaft moving in the same rotational direction depending on which one of the first and second one-way clutch bearings is engaged regardless of direction of flow of wind or water in-line with the turbine shaft.

6. An in-line platform river turbine where in-line is defined as a turbine shaft supporting at least one pair of opposing concentric wings and the turbine shaft facing a horizontal direction of water flow comprising;

the turbine shaft being in-line with the water flow and having the same horizontal direction of water flow of passing underneath an in-line platform of the in-line platform river turbine, the turbine shaft being connected to at least one pair of opposing concentric wings by first and second wing support shafts perpendicular to the turbine shaft for rotation of the at least one pair of opposing concentric wings;

the in-line platform being supported by first and second pontoons such that horizontal water flow is directed in the same direction as the turbine shaft and between the first and second pontoons, the in-line platform supporting a control module comprising a speed converter, a control motor for providing a constant speed input to the speed converter and an electricity generating module comprising a generator for generating electricity, the flow of water being of variable velocity and the electricity output of the generator having a constant voltage and frequency.

* * * * *